United States Patent
Hikokubo et al.

(10) Patent No.: US 7,130,587 B2
(45) Date of Patent: Oct. 31, 2006

(54) COMMUNICATION QUALITY ESTIMATION METHOD, COMMUNICATION QUALITY ESTIMATION APPARATUS, AND COMMUNICATION SYSTEM

(75) Inventors: Tsuneo Hikokubo, Tokyo (JP); Katsuaki Abe, Kawasaki (JP); Yutaka Murakami, Kawasaki (JP); Shinichiro Takabayashi, Kawasaki (JP)

(73) Assignees: National Institute of Information and Communications Technology Incorporated, Administrative Agency, Tokyo (JP); Matsushita Electric Industrial Co., Ltd., Osaka (JP)

( * ) Notice: Subject to any disclaimer, the term of this patent is extended or adjusted under 35 U.S.C. 154(b) by 539 days.

(21) Appl. No.: 10/432,601

(22) PCT Filed: Aug. 22, 2002

(86) PCT No.: PCT/JP02/08450

§ 371 (c)(1),
(2), (4) Date: Aug. 4, 2003

(87) PCT Pub. No.: WO03/019893

PCT Pub. Date: Mar. 6, 2003

(65) Prior Publication Data
US 2005/0075103 A1 Apr. 7, 2005

(30) Foreign Application Priority Data
Aug. 22, 2001 (JP) .............................. 2001-251940
Mar. 13, 2002 (JP) .............................. 2002-068831

(51) Int. Cl.
*H04B 17/00* (2006.01)

(52) U.S. Cl. ............... 455/67.11; 455/69; 455/522; 455/67.13; 455/63.1; 370/335; 370/342; 375/265; 375/242; 375/261; 375/308

(58) Field of Classification Search ............ 455/522, 455/69, 61; 370/335, 342; 375/265, 308
See application file for complete search history.

(56) References Cited

U.S. PATENT DOCUMENTS 5,648,991 A * 7/1997 Namekata et al. .......... 375/341

(Continued)

FOREIGN PATENT DOCUMENTS

JP 6-205052 7/1994

(Continued)

OTHER PUBLICATIONS

English Language Abstract of JP 2001-86494.

(Continued)

*Primary Examiner*—Marceau Milord
(74) *Attorney, Agent, or Firm*—Greenblum & Bernstein, p.l.c.

(57) ABSTRACT

An average signal point amplitude detection section 15A determines an average position of I and Q components when a received QPSK modulated signal is demodulated and a threshold calculation section 15B determines threshold ths on an IQ plane based on the average signal point position of the received QPSK modulated signal and a theoretical distribution position on the IQ plane of signal points of a 16-value QAM signal. Then, a threshold decision section 14A makes a threshold-decision on the I and Q components of sequentially received QPSK modulated signals using this threshold ths and thereby calculates a simulated bit error rate of the 16-value QAM signal.

43 Claims, 22 Drawing Sheets

U.S. PATENT DOCUMENTS

| | | | |
|---|---|---|---|
| 5,995,551 A * | 11/1999 | McCallister et al. | 375/265 |
| 6,021,159 A | 2/2000 | Nakagawa | |
| 6,115,417 A * | 9/2000 | Matsunaga et al. | 375/226 |
| 6,160,838 A * | 12/2000 | Shinohara et al. | 375/130 |
| 6,246,732 B1 * | 6/2001 | Kobayashi et al. | 375/346 |
| 6,292,477 B1 * | 9/2001 | Ohgoshi et al. | 370/335 |
| 6,363,100 B1 * | 3/2002 | Ohki et al. | 375/141 |
| 6,452,983 B1 * | 9/2002 | Asahara et al. | 375/324 |
| 6,456,609 B1 * | 9/2002 | Ohgoshi et al. | 370/335 |
| 6,473,472 B1 * | 10/2002 | Uchiki et al. | 375/341 |
| 6,804,217 B1 * | 10/2004 | Miyatani et al. | 370/335 |

FOREIGN PATENT DOCUMENTS

| | | |
|---|---|---|
| JP | 8-102727 | 4/1996 |
| JP | 10-336262 | 12/1998 |
| JP | 2001-86494 | 3/2001 |

OTHER PUBLICATIONS

English Language Abstract of JP 10-336262.

English Language Abstract of JP 6-205052.

English Language Abstract of JP 10-102727.

"An Estimation Method of Communication Link Quality on Adaptive Modulation", Abe et al., IEICE B-5-99, p. 549, Mar. 2002, with an English language translation of Section 2, lines 6-13.

"Mobile Communication", Sasaoka, Ohmsha, Ltd., pp. 103-126, with an English language translation.

* cited by examiner $$\text{ths\_i}_1 = \text{ths\_q}_1 = \left(1 - \frac{1}{\sqrt{21}} \, a\right)$$

$$\text{ths\_i}_2 = \text{ths\_q}_2 = \left(1 + \frac{1}{\sqrt{21}} \, a\right)$$

COMMUNICATION QUALITY ESTIMATION METHOD, COMMUNICATION QUALITY ESTIMATION APPARATUS, AND COMMUNICATION SYSTEM

TECHNICAL FIELD

The present invention relates to a communication quality estimation method, communication quality estimation apparatus and communication system, and is preferably used in a radio communication system using, for example, an adaptive modulation system.

BACKGROUND ART

Conventionally, a radio communication system performs various kinds of system control to carry out communications with high quality and high efficiency. These kinds of control include, for example, transmit power control, communication channel control, cell changeover control, etc., which improves communication quality and promotes power saving as well.

Furthermore, a study on an adaptive communication system, which adaptively switches between modulation systems or between coding systems according to the communication quality of a radio communication link is also underway in recent years. For example, "Mobile Communication" (written and edited by Shuichi Sasaoka, Ohmsha, Ltd. P. 103 to 126) discloses a communication system using adaptive modulation, which is an example of an adaptive communication system. Communication quality on a communication link is often measured and used as information for making a decision on changeover between modulation systems or coding systems.

As indices of communication quality, a Bit Error Rate (BER), reception power and Carrier to Noise Ratio (CNR), etc., are often used. There is a method of estimating a bit error rate out of these indices and using it as an index of communication quality, whereby a known data string such as pseudonoise sequence is inserted in a transmission data string, this known data string is compared with a received data string and different data pieces are counted to thereby calculate the bit error rate.

There is another method whereby a transmission data string is subjected to error correcting coding, subjected to forward error correction at the time of reception and then recoded, this recoded data string is compared with the received signal string and different data pieces are counted to calculate the bit error rate. Furthermore, as disclosed, for example, in the Unexamined Japanese Patent Publication No. HEI 8-102727, a method of calculating a signal vector dispersion value and calculating a bit error rate from this dispersion value is also known.

With reference to FIG. 1, a configuration of a bit error rate calculation apparatus 1 will be explained as an example of a conventional apparatus for measuring communication quality below. In a communication system in which this conventional bit error rate calculation apparatus 1 is used, suppose data is transmitted with a predetermined data string inserted in a predetermined section of a transmission burst. For example, suppose a specific string of a pseudonoise sequence is inserted in the center of the burst. An orthogonal demodulation section 2 carries out orthogonal demodulation and synchronization processing on a received signal and outputs an orthogonal IQ vector string for each received symbol.

A bit decision section 3 carries out a bit decision using the orthogonal IQ vector string input and outputs the resulting received data. A known data section extraction section 4 extracts data corresponding to the section of the known data string inserted in the above-described burst from the received data string input and outputs the extracted data.

A bit error rate calculation section 6 compares the data string extracted by the known data section extraction section 4 with the data string stored in a known data storage section 5. When the received data contains some errors, the comparison results at the error locations show differences. Thus, by counting the number of bits with different comparison results for a predetermined period of time and calculating its ratio to the total number of bits compared, it is possible to calculate the bit error rate of the received signal statistically.

However, in a situation in which the bit error rate is low, calculating a statistically reliable bit error rate requires a sufficient total number of bits compared. As a result, it takes a long time to calculate the bit error rate.

For example, suppose a system that adaptively switches between two modulation systems of a QPSK modulation system and 16-value QAM modulation system according to the communication quality of a communication link as an example of the aforementioned adaptive communication system. Since the QPSK and 16-value QAM have different distances between signal points during modulation, these modulation systems differ in reception performance as shown in FIG. 2 and when data is received with the same reception power, it is generally known that QPSK has a lower bit error rate.

As information for making a decision in changeover between these two modulation systems, assume that modulation changeover between modulation systems is controlled using the result of bit error rate calculation using the bit error rate calculation apparatus 1 shown in FIG. 1 in such a way that the bit error rate does not exceed 1.0E-3. First, when the modulation system is changed from 16-value QAM to QPSK, it is possible to perform control in such a way that while monitoring a BER estimation result during 16-value QAM reception, the modulation system is changed to QPSK when this bit error rate exceeds an allowable value (e.g., 5.0E-4).

When the modulation system is changed from QPSK to 16-value QAM, it is likewise necessary to decide the changeover during a QPSK communication. For example, when Carrier to Noise Ratio (CNR) exceeds 17 dB during QPSK reception, the bit error rate of 16-value QAM also falls below 1.0E-3 as shown in FIG. 2, and therefore the changeover to 16-value QAM is decided.

FIG. 3 is an example of a distribution characteristic of an orthogonal IQ vector string for each received symbol obtained when QPSK reception demodulation is performed at a Carrier to Noise Ratio of 17 dB. Though signal points are dispersed due to influences of noise, there is almost no dispersion beyond the I and Q axes, and therefore bit errors with QPSK-occur only with a frequency equal to or lower than 1.0E-6. It takes an enormous number of reception bit samples and time for QPSK to check a bit error rate as small as 1.0E-6, and checking such a bit rate is unrealistic.

Thus, when the modulation system is changed from a modulation system such as QPSK with a relatively low bit error rate to a modulation system such as 16-value QAM with a relatively high bit error rate, there is a difficult problem in performing speedy changeover without increasing transmission errors involved in the changeover.

DISCLOSURE OF INVENTION

It is an object of the present invention to provide a communication quality estimation method and communication quality estimation apparatus capable of speedily and accurately determining communication quality based on a transmission signal according to a modulation system with a low bit error rate when a signal according to a modulation system with a high bit error rate is transmitted. Furthermore, it is another object of the present invention to provide a communication system capable of providing appropriate changeover between modulation systems in a system that changes its modulation system from a modulation system with a low bit error rate to a modulation system with a high bit error rate according to communication quality.

These objects are achieved by, based on the signal point positions of a digital-modulated signal received at a low bit error rate, estimating in simulation the bit error rate or bit errors of a digital-modulated signal transmitted with a high bit error rate through the same transmission path.

BEST MODE FOR CARRYING OUT THE INVENTION

With reference now to the attached drawings, embodiments of the present invention will be explained in detail below.

(Embodiment 1)

Figure 1:
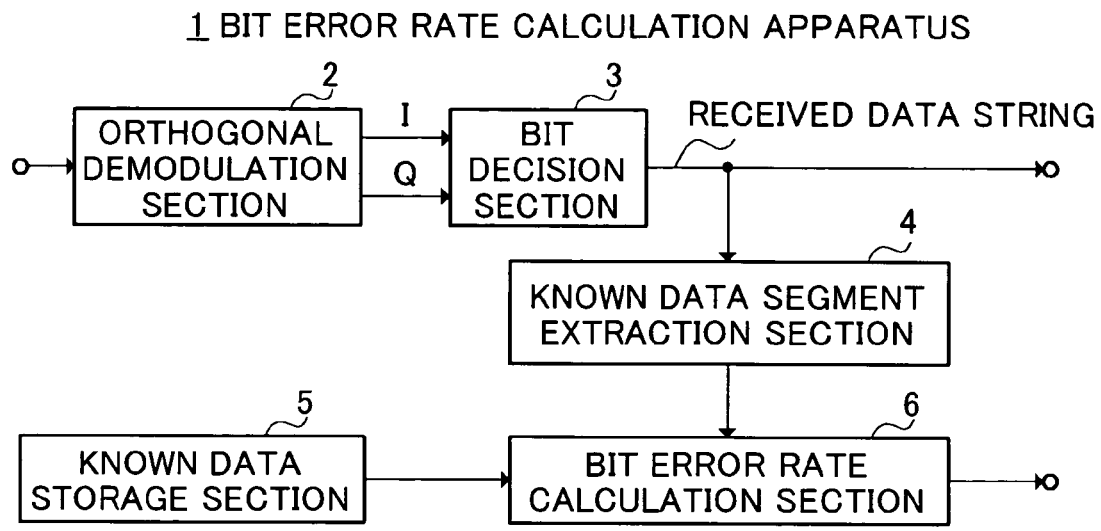
FIG. 1 is a block diagram showing a configuration of a conventional bit error rate calculation apparatus.
Figure 2:
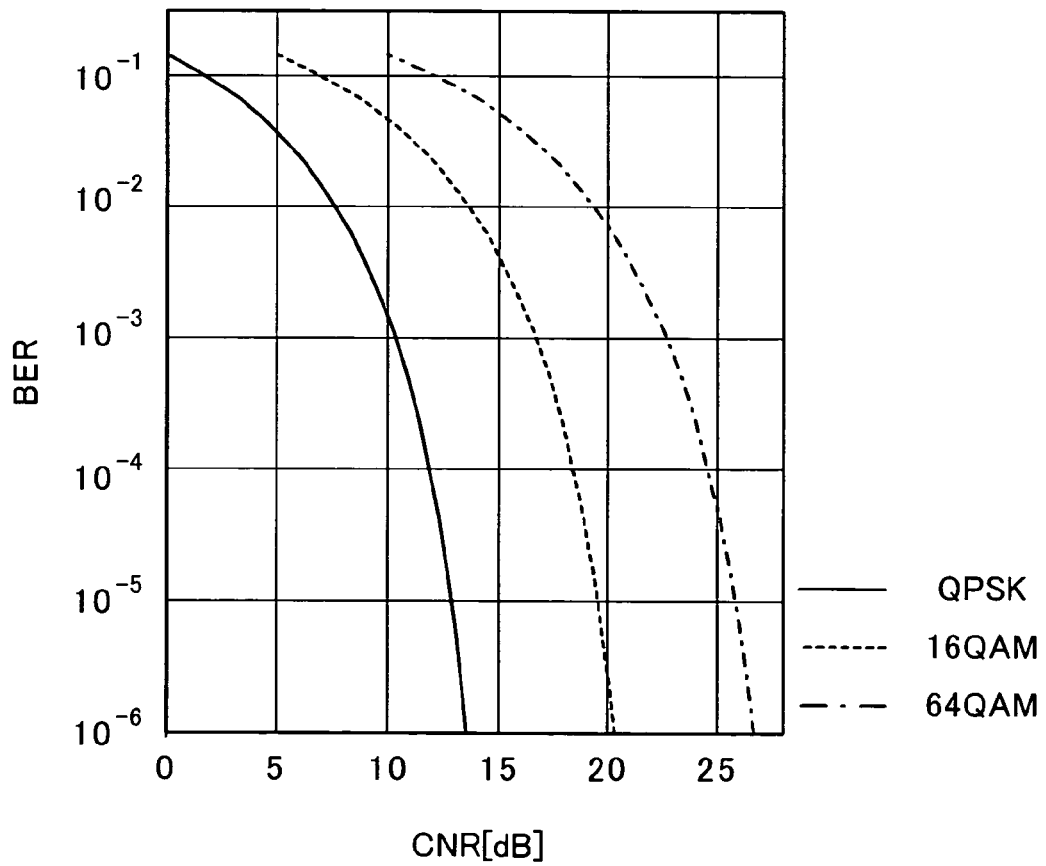
FIG. 2 illustrates characteristic curves showing bit error rates of 16-value QAM and 64-value QAM.
Figure 3:
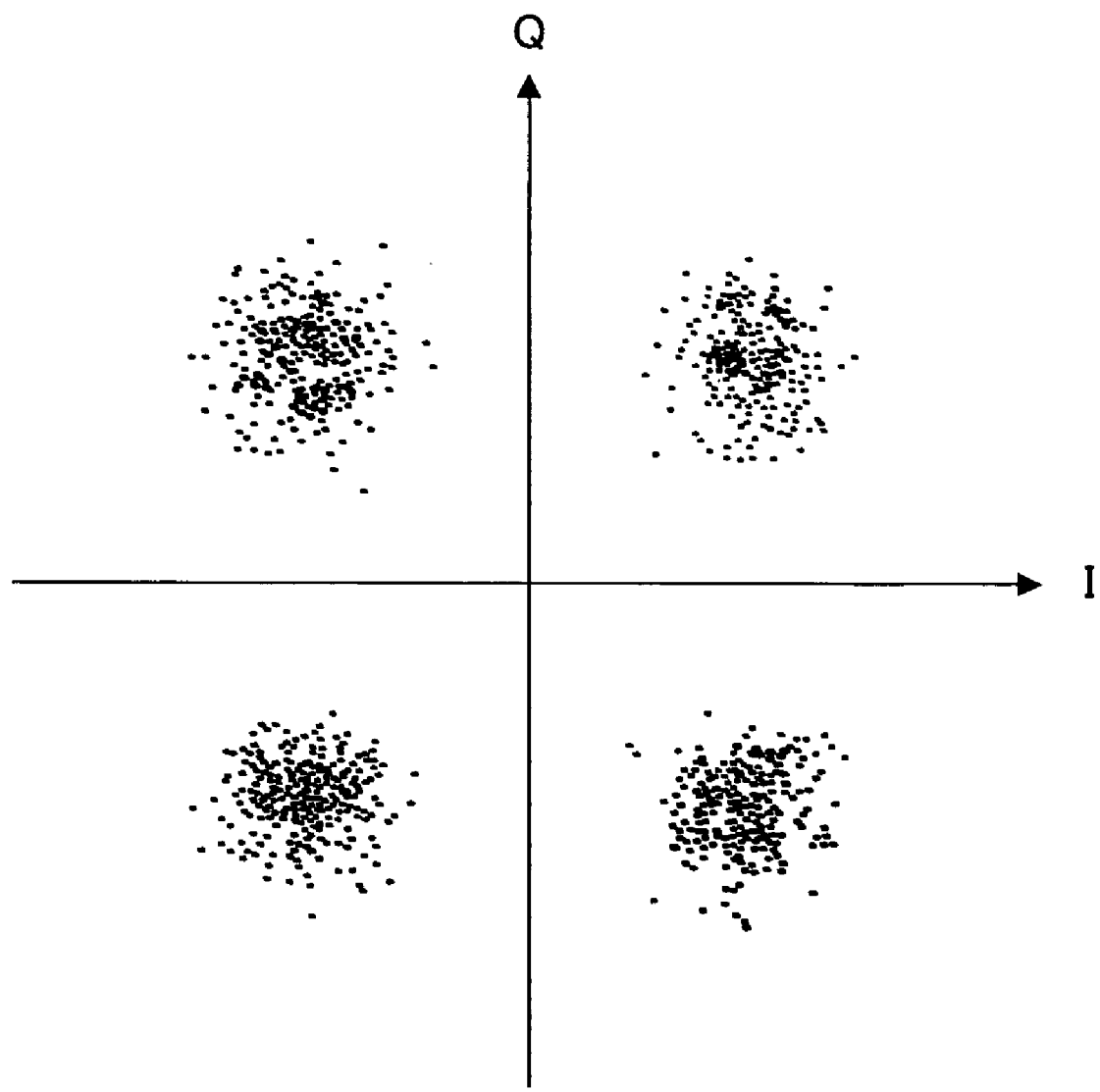
FIG. 3 illustrates a distribution state of a QPSK modulated signal on an IQ plane.
Figure 4:
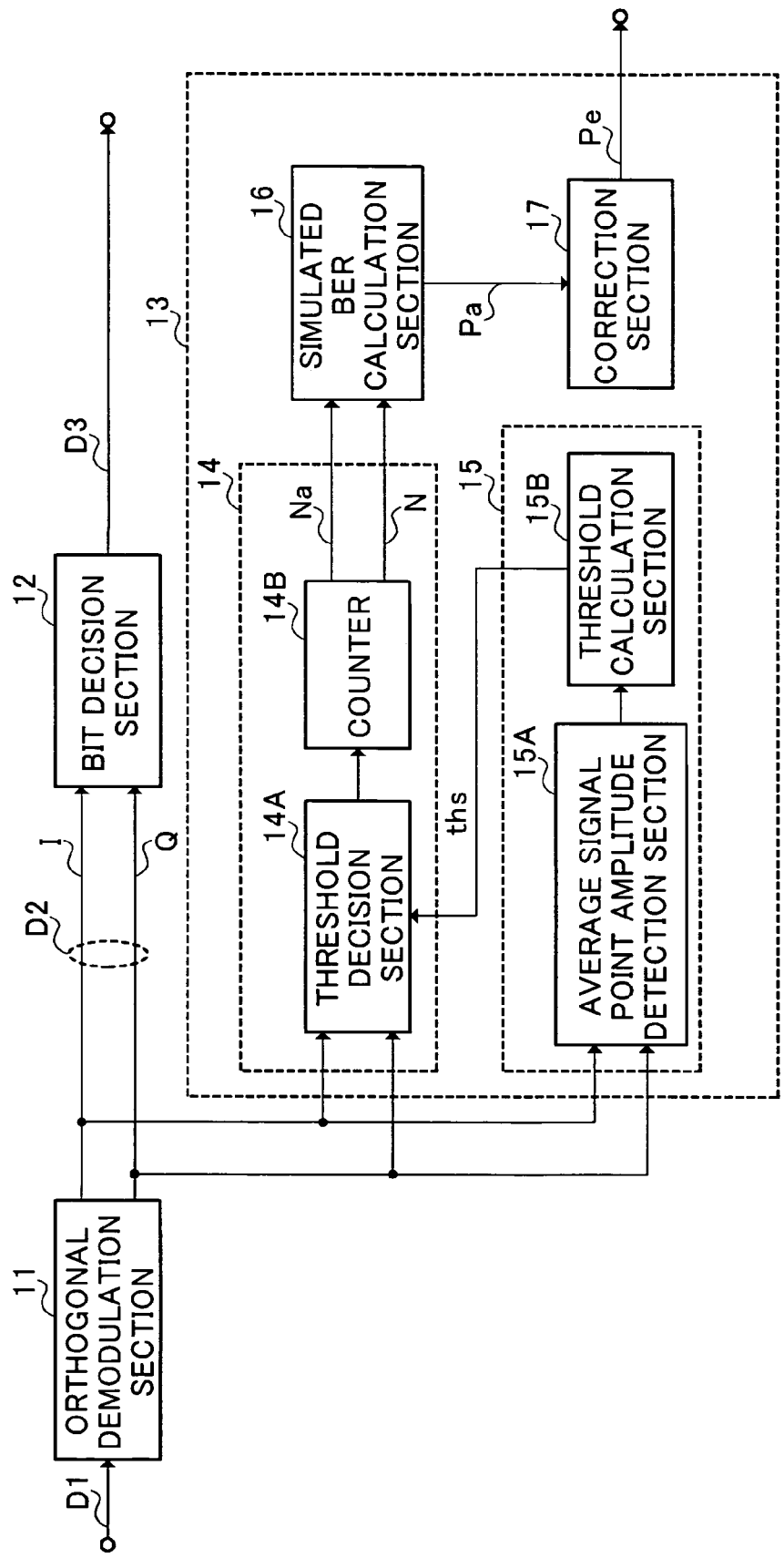
FIG. 4 is a block diagram showing a configuration of a bit error rate calculation apparatus according to Embodiment 1 of the present invention.

In FIG. 4, reference numeral 10 as a whole denotes a bit error rate calculation apparatus according to Embodiment 1 and inputs a QPSK modulated signal D1 to an orthogonal demodulation section 11. The orthogonal demodulation section 11 applies orthogonal demodulation processing, symbol synchronization processing and correction processing for frequency, amplitude or distortion, etc., as required to the QPSK modulated signal D1 and thereby outputs each symbol as an orthogonal IQ vector (a vector having an I and Q components on the IQ plane) signal D2. A bit decision section 12 detects the position of each received symbol on the IQ plane and thereby carries out a bit decision on the orthogonal IQ vector signal D2 of each received symbol and outputs the decided bit data string D3.

On the other hand, the bit error rate calculation apparatus 10 sends the orthogonal IQ vector signal D2 to a bit error rate estimation section 13. The bit error rate estimation section 13 estimates, in simulation, the bit error rate assuming a 16-value QAM signal is received from the orthogonal IQ vector string of the received QPSK modulated signal D1. The bit error rate estimation section 13 sends the orthogonal IQ vector signal D2 to a threshold decision section 14A of a threshold decision error count section 14 and at the same time sends the orthogonal IQ vector signal D2 to an average signal point amplitude detection section 15A of a threshold calculation section 15.

The threshold decision error count section 14 performs an error decision on the amplitude bits of the 16-value QAM signal, in simulation, by deciding amplitude values of the orthogonal IQ vector components of the QPSK modulated signal based on a threshold and outputs a threshold decision error count Na and a total threshold decision count N within a predetermined time. The threshold calculation section 15 calculates a threshold ths to be used for a threshold decision from the orthogonal IQ vector string.

The threshold calculation section 15 inputs the orthogonal IQ vector signal D2 to an average signal point amplitude detection section 15A and then calculates a threshold according to the average signal point amplitude through a threshold calculation section 15B that follows. The average signal point amplitude detection section 15A detects an average amplitude on the IQ plane of sequentially input IQ vectors. By the way, it is assumed here that the "average amplitude" does not mean the length of an IQ vector on the IQ plane but means a distance from the I-axis and a distance from the Q-axis.

Figure 5:
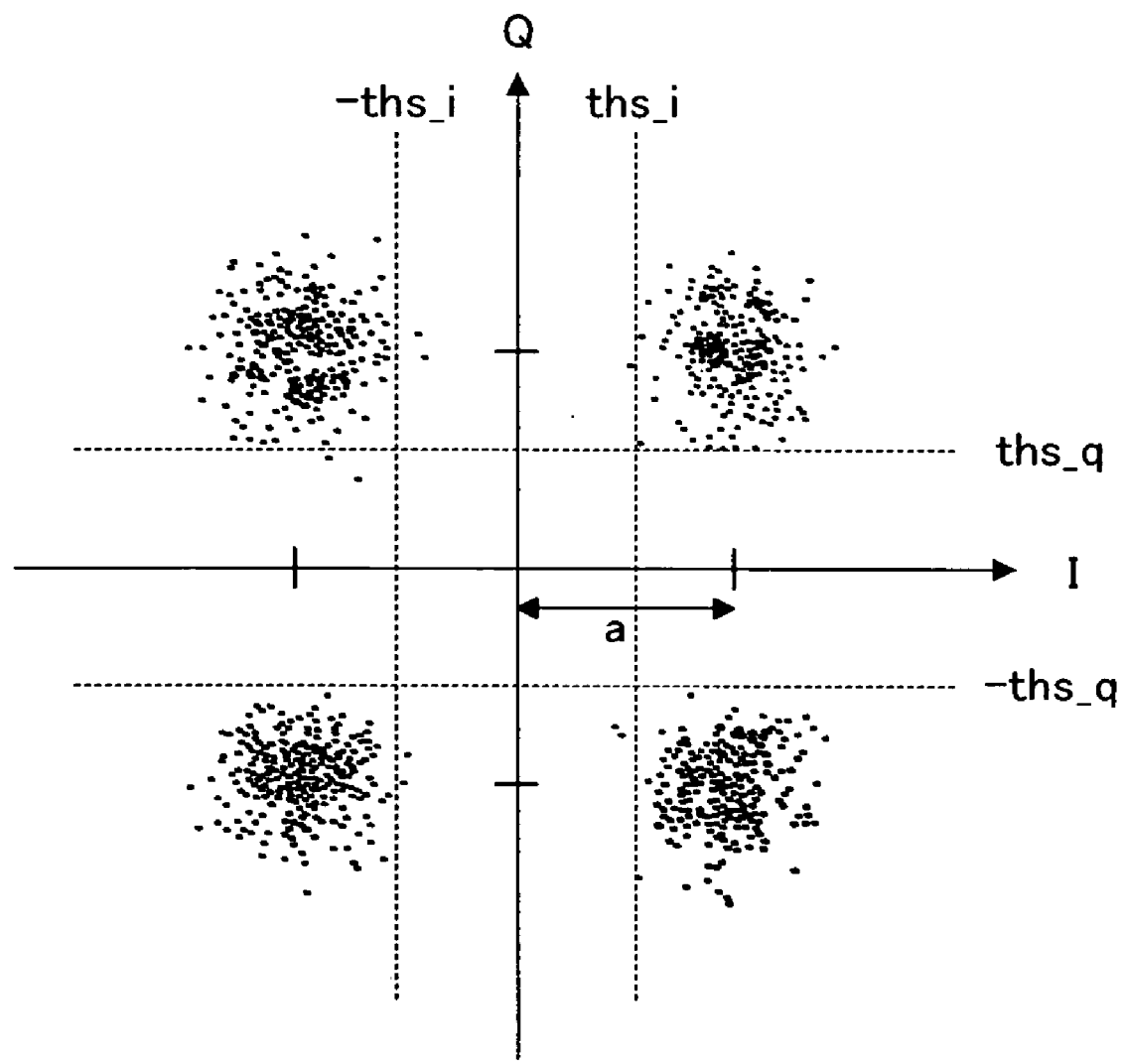
FIG. 5 illustrates a distribution of an orthogonal IQ vector when a QPSK signal is received.

More specifically, when the vector string of the orthogonal IQ vector signal D2 is plotted on the IQ plane, it appears as shown in FIG. 5. FIG. 5 shows an example of the orthogonal IQ vector string obtained when the QPSK modulated signal is received and demodulated at a carrier to noise ratio of 17 dB. The average signal point amplitude detection section 15A detects an average distance a of the IQ vector from the Q-axis (the same applies to an average distance from the I-axis).

The threshold calculation section 15B calculates a simulated threshold for the 16-value QAM signal based on a theoretical distribution state of signal points of the 16-value QAM signal on the IQ plane when the 16-value QAM signal is received with the same power as the reception power of the current QPSK modulated signal and the average signal point amplitude a detected by the average signal point amplitude detection section 15A.

Figure 6:
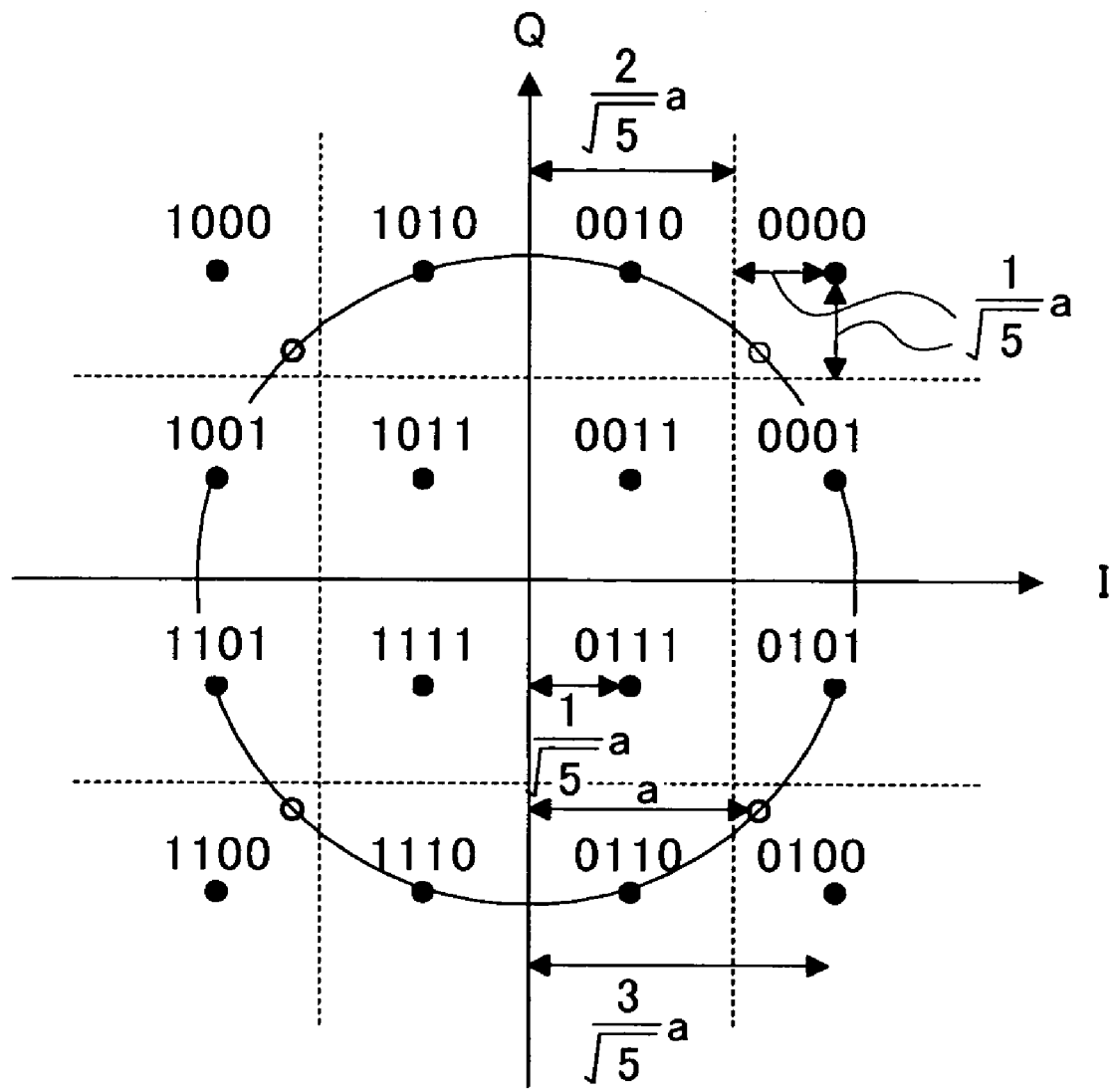
FIG. 6 illustrates a signal point configuration of a QPSK signal and 16-value QAM signal with the same power.

More specifically, four average signal point vectors of the QPSK modulated signal can be expressed as (±a, ±a). When the 16-value QAM signal with the same power as that of this QPSK modulated signal is received, the I and Q components of the signal amplitude of the 16-value QAM signal take four values $\pm a/\sqrt{5}$, $\pm 3a/\sqrt{5}$ as shown in FIG. 6. A gray-coded 16-value QAM generally decides 2 of the 4 bits that indicate one symbol by deciding as positive or negative the signs of the I and Q components of an orthogonal IQ vector for each symbol of the received signal and decides the remaining 2 bits by deciding which amplitude is bigger or smaller. Of these values, the thresholds corresponding to the amplitude decision are $I=\pm 2a/\sqrt{5}$, $Q=\pm 2a/\sqrt{5}$ as expressed by dotted lines in FIG. 6 and set at a distance of $a/\sqrt{5}$ from the respective signal points of the 16-value QAM signal for both the I-axis and Q-axis.

Figure 7:
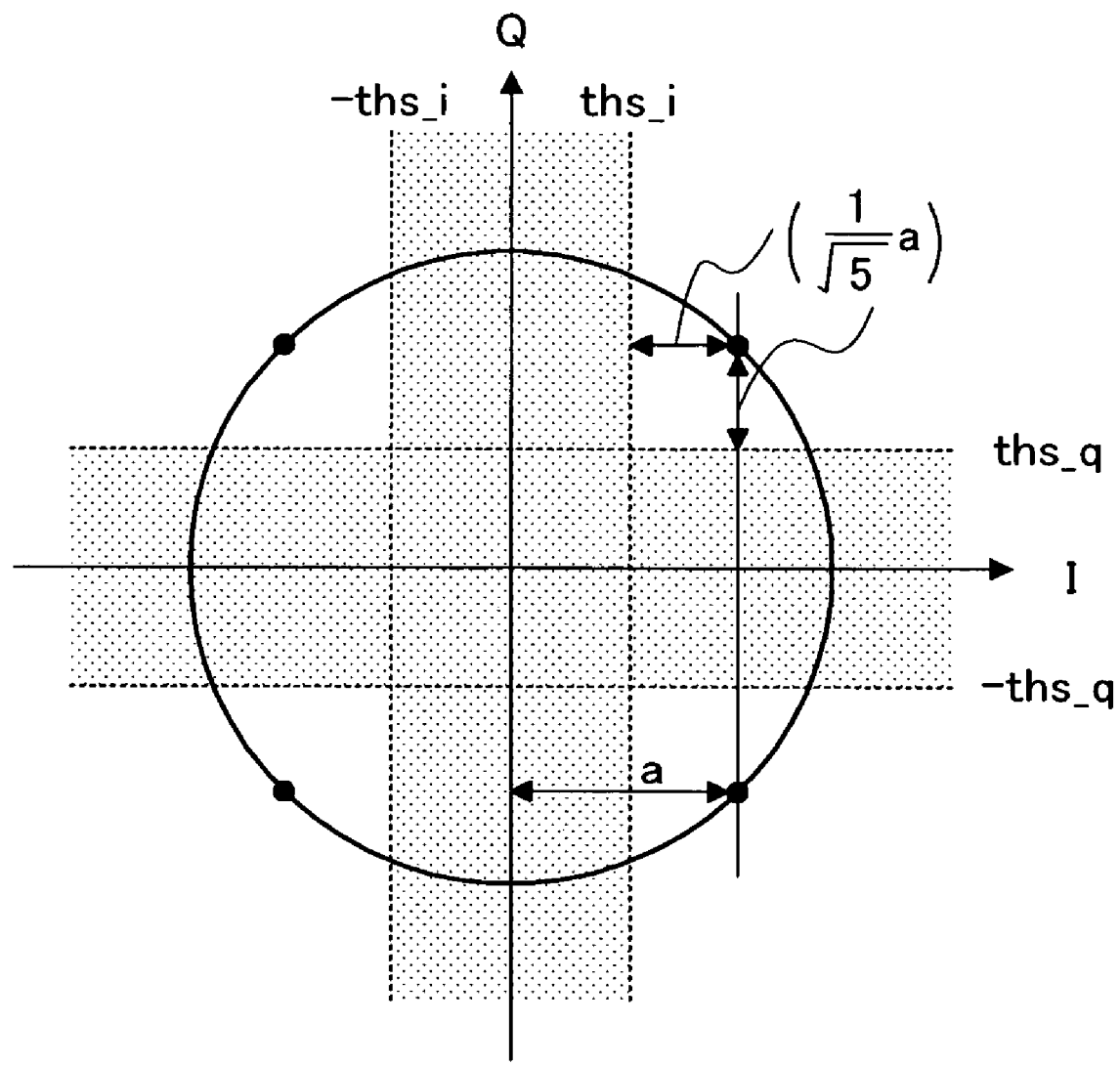
FIG. 7 illustrates an example of setting thresholds for the QPSK signal according to Embodiment 1.

Considering this, the threshold calculation section 15B sets thresholds at a distance of $a/\sqrt{5}$ from the four average signal point vectors (±a, ±a) of the QPSK modulated signal. That is, as shown in FIG. 7, the threshold calculation section 15B calculates thresholds $ths\_i=\pm(1-1/\sqrt{5})a$, $ths\_q=\pm(1-1/\sqrt{5})a$ of the I and Q components. These thresholds are sent to the threshold decision section 14A of the threshold decision error count section 14.

The threshold decision section 14A receives the orthogonal IQ vector signal D2 and threshold ths and carries out threshold decision processing on the sequentially input orthogonal IQ vectors based on the threshold ths. In practice, when the I and Q components of the orthogonal IQ vector of the received symbol fall below the thresholds ths_i and ths_q, that is, when the I and Q components of the orthogonal IQ vector exist within the shaded area of FIG. 6, the threshold decision section 14A decides in simulation that amplitude decision bit errors occur in the 16-value QAM signal. The counter 14B counts the error decision count Na and the total decision count N.

That is, the threshold decision section 14A increments the error decision count Na of the counter 14B for vectors rx=(ri, rq) of sequentially input received symbols when the following expression (1) is satisfied and further increments Na when the following expression (2) is satisfied. This processing is carried out over a predetermined period.

$$-ths\_i < ri < ths\_i \quad (1)$$

$$-ths\_q < rq < ths\_q \quad (2)$$

The simulated BER calculation section 16 calculates an amplitude decision bit error rate Pa in simulation, assuming that the 16-value QAM signal is received using the error decision count Na and total decision count N as shown in the following expression (3):

$$Pa=Na/N \quad (3)$$

The correction section 17 calculates a practical bit error rate Pe by carrying out statistics-based correction processing on the amplitude decision bit error rate Pa calculated at the simulated BER calculation section 16. That is, the relationship between the amplitude decision bit error rate Pa for the 16-value QAM, bit error rate Ps of the code decision bit and overall bit error rate Pe is known to be expressed statistically by the following expression (4) and expression (5). (For example, "Modulation/Demodulation of Digital Radio Communication" (by Yoichi Saito).

$$Ps=(½)\times Pa \quad (4)$$

$$Pe=(Pa+Ps)/2=(¾)\times Pa \quad (5)$$

Thus, using the expressions (3) and (5), the simulated bit error rate Pe is calculated, assuming the 16-value QAM signal is received, as shown in the following expression (6), and output from the correction section 17.

$$Pe=(¾)\times Na\times Na/N \quad (6)$$

Figure 8:
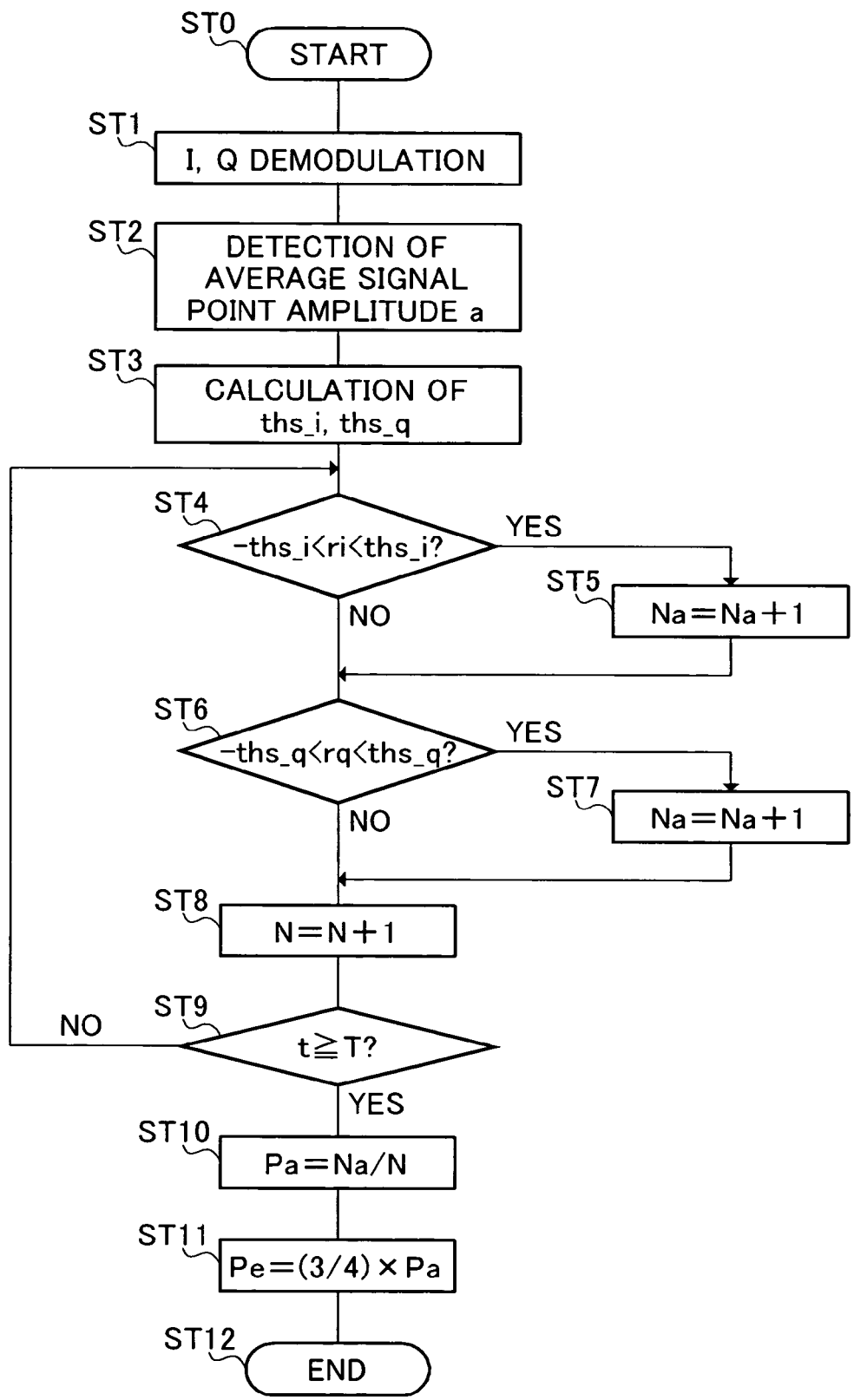
FIG. 8 is a flow chart to illustrate an operation of the bit error rate calculation apparatus according to Embodiment 1.

In the above-described configuration, from a QPSK modulated signal that is received, the bit error rate calculation apparatus 10 calculates, in simulation, the bit error rate Pe of a 16-value QAM signal, according to the operation as shown in FIG. 8.

When the bit error rate calculation apparatus 10 starts bit error rate calculation processing in step ST0, it determines the I and Q components of the QPSK modulated signal D1 by orthogonal-demodulating the received QPSK modulated signal D1 in step ST1.

In the next step ST2, the bit error rate calculation apparatus 10 determines an average signal point amplitude a of a plurality of symbols of the QPSK modulated signal and in step ST3, it calculates thresholds ths_i and ths_q for the 16-value QAM signal on the IQ plane based on the average signal point amplitude a and the theoretical distribution state (FIG. 6) when the 16-value QAM signal is received with the same power.

Then, the bit error rate calculation apparatus 10 carries out threshold decision processing on the I and Q components of sequentially received symbols of a QPSK modulated signal in step ST4 and step ST6. That is, in step ST4, it is decided whether the I component ri of the QPSK demodulated signal is greater than –ths_i and smaller than ths_i or not and when a positive result is obtained, the bit error rate calculation apparatus 10 moves on to step ST5, increments the error decision count Na of the counter 14B and when a negative result is obtained, it moves on to step ST6.

In step ST6, it is decided whether the Q component rq of the QPSK demodulated signal is greater than —ths_q and smaller than ths_q or not and when a positive result is obtained, the bit error rate calculation apparatus 10 moves on to step ST7, increments the error decision count Na of the counter 14B and when a negative result is obtained, it moves on to step ST8. Thus, when both the I and Q components of the QPSK demodulated signal are included in the shaded area shown in FIG. 7, the bit error rate calculation apparatus 10 increments the error decision count Na twice. In this way, for a received symbol having quite a high bit error rate, the bit error rate calculation apparatus 10 reflects the high bit error rate in the error decision count Na.

In step ST8, the bit error rate calculation apparatus 10 increments the total decision count N of the counter 14B and moves on to step ST9. In step ST9, a decision time t from step ST4 to step ST8 is calculated and when the decision time t falls short of a predetermined set time T, the process goes back to step ST4 and repeats the processes in step ST4 to step ST8. Then, when the decision time t reaches and exceeds the set time T, a positive result is obtained in step ST9 and the process goes to step ST10.

In step ST10, the bit error rate calculation apparatus 10 calculates an amplitude decision bit error rate Pa when the 16-value QAM signal is received using the error decision count Na and total decision count N calculated by the processes so far. Then, instep ST11, the bit error rate calculation apparatus 10 multiplies the amplitude decision bit error rate Pa by a statistics-based correction value to calculate a simulated bit error rate Pe, assuming the 16-value QAM signal is received and then finishes the bit error rate calculation processing operation in step ST12.

Thus, the bit error rate calculation apparatus 10 can calculate a bit error rate speedily and accurately when a 16-value QAM signal is received based on the received QPSK modulated signal.

That is, according to the conventional art, the transmitting side decides the timing for changeover from a QPSK modulation to 16-value QAM modulation based on bit error rate detection of the QPSK demodulated signal on the receiving side in such a way that a bit error rate is detected by detecting whether the I and Q components of the QPSK demodulated signal have transferred to the neighboring quadrant beyond the I-axis and Q-axis or not and when the bit error rate falls below a predetermined value, transmission by QPSK modulation is changed to transmission by 16-value QAM modulation. However, since the QPSK modulation system is a modulation system with a low bit error rate, the I and Q components hardly transfer to the neighboring quadrant beyond the I-axis and Q-axis in a situation in which communication quality is relatively high. As a result, there is a disadvantage that it takes a long time to decide whether the bit error rate has reached a value suitable for transmission with 16-value QAM or not.

On the other hand, instead of calculating the bit error rate based on whether the I and Q components of the QPSK demodulated signal have transferred beyond the I-axis and Q-axis or not, the bit error rate calculation apparatus 10 determines new thresholds ths_i and ths_q considering the distribution position of the 16-value QAM signal on the IQ plane and the amplitude when a bit error occurs and decides the I and Q components of the sequentially received QPSK modulated signals based on these thresholds ths_i and ths_q and calculates a simulated bit error rate of the 16-value QAM signal, and can thereby speedily and accurately determine whether the bit error rate has reached the value suitable for transmission with 16-value QAM or not.

Figure 9:
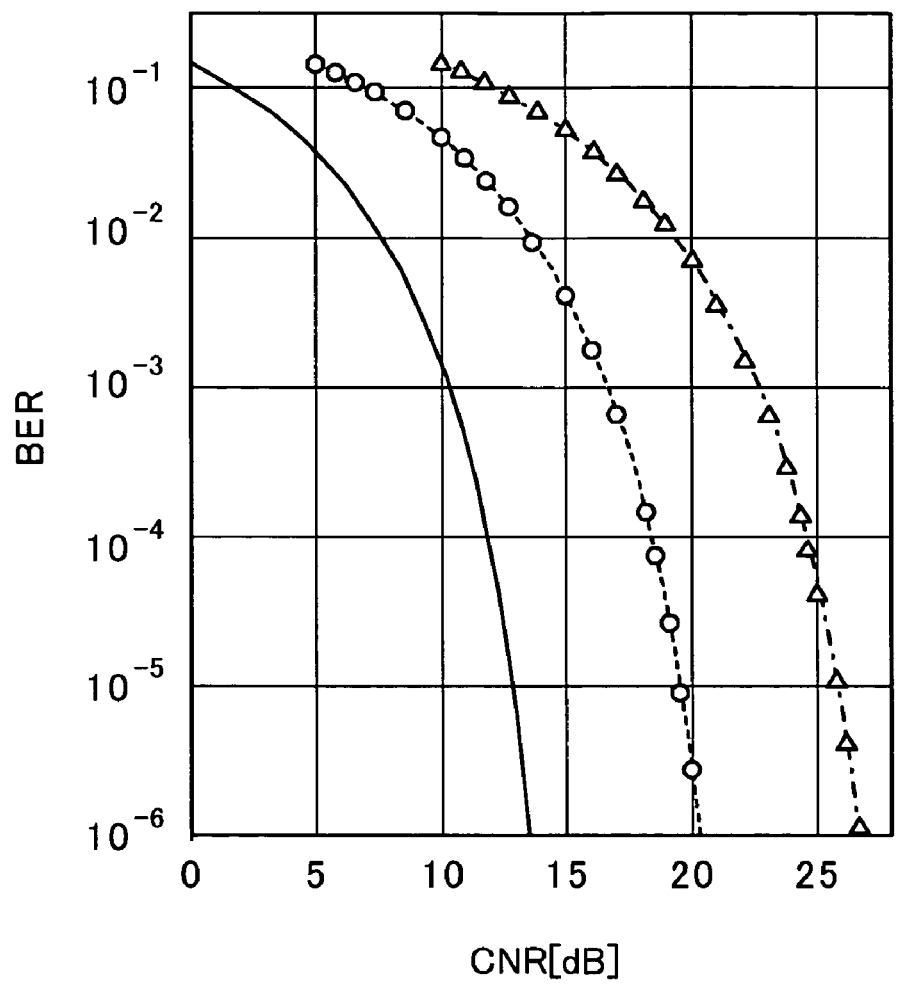
FIG. 9 illustrates characteristic curves of simulated bit error rates of the 16-value QAM and 64-value QAM obtained in Embodiments 1 and 2 and a bit error rate actually obtained through reception by synchronization detection.

Thus, when the calculation results of a simulated bit error rate Pe of the 16-value QAM signal from the demodulated I and Q components of the QPSK modulated signal are plotted, their characteristic is as shown by marks ○ in FIG. 9 and it is possible to confirm that this characteristic substantially matches a reception bit error rate characteristic (dotted line) when a 16-value QAM signal is actually received in the same reception power environment.

Thus, according to the above-described configuration, thresholds ths_i and ths_q on the IQ plane are determined based on average positions of the I and Q components when the received QPSK modulated signal is demodulated and a theoretical distribution position of the 16-value QAM signal on the IQ plane, and a threshold decision is made on the I and Q components of the sequentially received QPSK modulated signals using these thresholds ths_i and ths_q to thereby calculate a simulated bit error rate of a 16-value QAM signal, and in this way it is possible to determine the bit error rate speedily and accurately when a 16-value QAM signal instead of a QPSK modulated signal is transmitted through the same transmission path.

As a result, when the transmitting side changes the modulation system from a QPSK modulation system to a 16-value QAM modulation system, it is possible to perform the changeover speedily and accurately without increasing transmission errors involved in the changeover.

(Embodiment 2)

Figure 10:
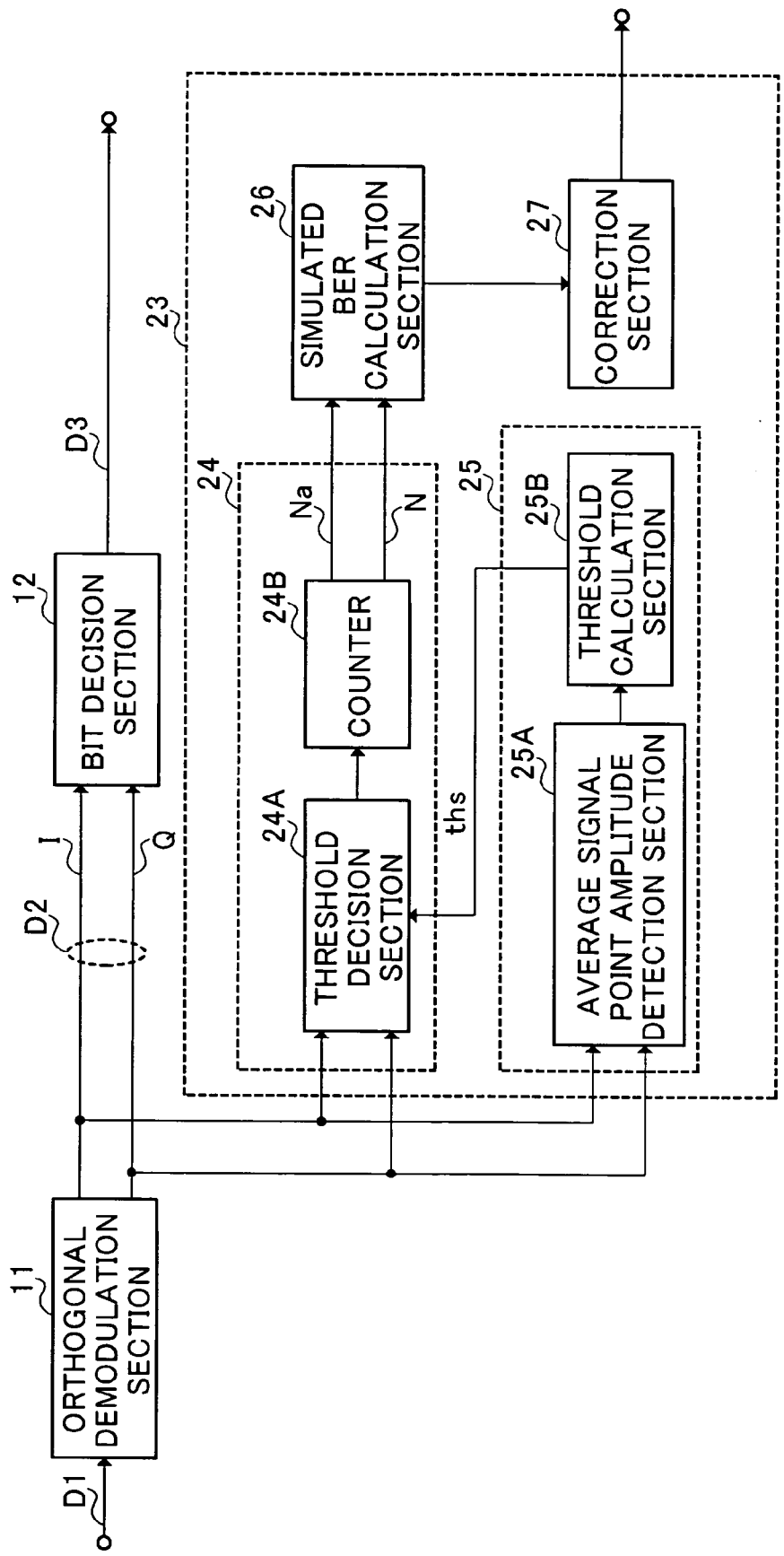
FIG. 10 is a block diagram showing a configuration of a bit error rate calculation apparatus according to Embodiment 2.

This embodiment will explain a method whereby, when a QPSK modulated signal is received, the bit error of a 64-value QAM signal with the same reception power is calculated in simulation. FIG. 10 in which the same components as those in FIG. 4 are shown with the same reference numerals assigned shows a configuration of a bit error rate calculation apparatus 20 according to Embodiment 2.

A bit error rate estimation section 23 of the bit error rate calculation apparatus 20 is designed to estimate a bit error rate of a 64-value QAM signal in simulation, assuming a 64-value QAM signal is received from an orthogonal IQ vector string of the received QPSK modulated signal D1. In this case, an average signal point detection section 25A of a threshold calculation section 25 detects an average amplitude of sequentially input IQ vectors on the IQ plane. The threshold calculation section 25B calculates a simulated threshold ths for the 64-value QAM signal based on a theoretical distribution state of the 64-value QAM signal on the IQ plane when the 64-value QAM signal is received with the same power as the reception power of the current QPSK modulated signal and an average signal point amplitude a detected at the average signal point amplitude detection section 25A.

The threshold decision error count section 24 performs an error decision on the amplitude bits of the 64-value QAM signal in simulation, by deciding amplitude values of the orthogonal IQ vector components of the sequentially input QPSK modulated signals based on the threshold ths, and outputs a threshold decision error count Na and a total threshold decision count N within a predetermined time.

The simulated BER calculation section 26 calculates an amplitude decision bit error rate Pa when the 64-value QAM signal is received using the error decision count Na and total decision count N. The correction section 27 calculates a practical bit error rate Pe by carrying out statistics-based correction processing on the amplitude decision bit error rate Pa calculated at the simulated BER calculation section 26.

Figure 11:
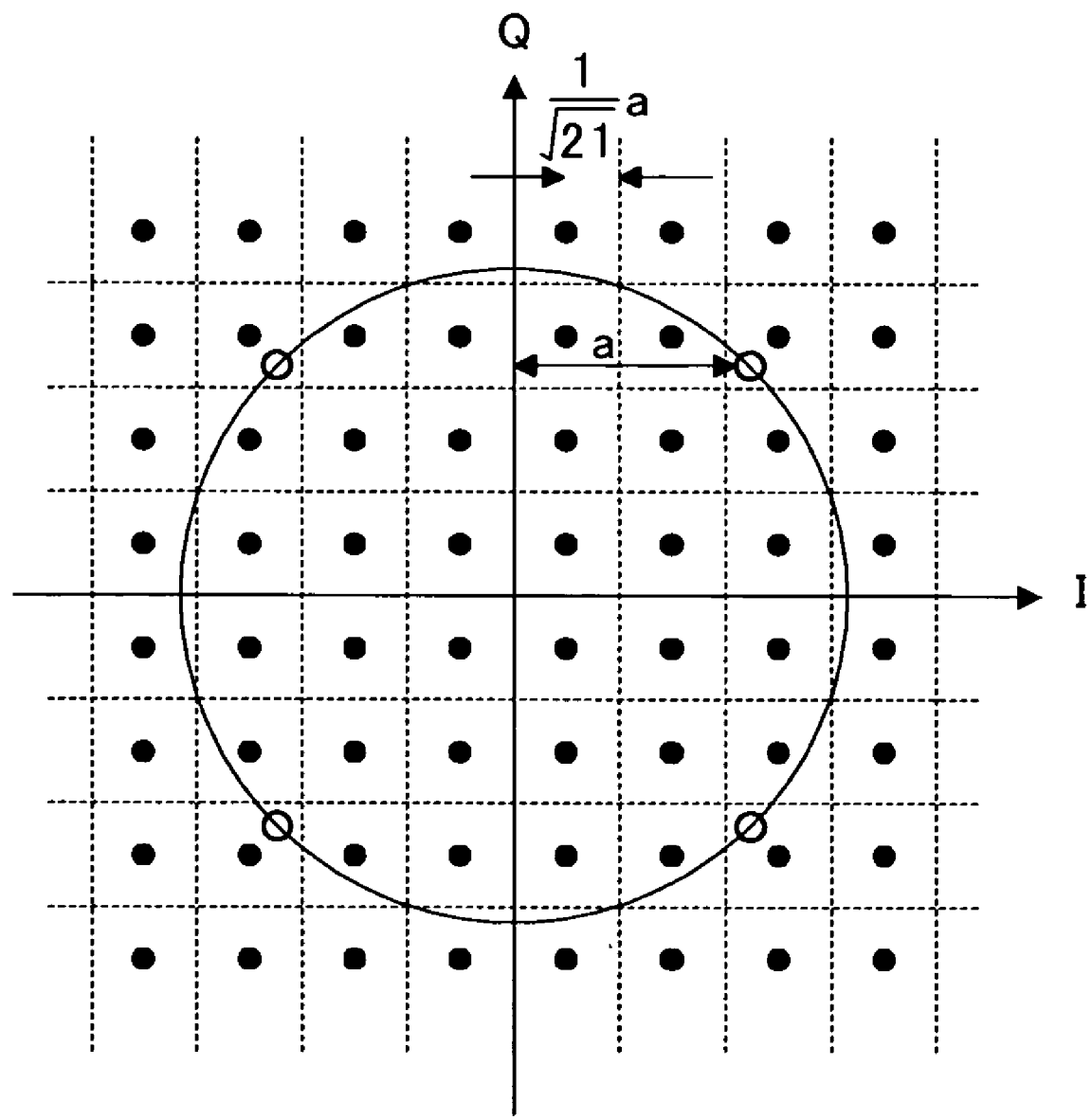
FIG. 11 illustrates a signal point configuration of a QPSK signal and 16-value QAM signal with the same power.

The processing of the bit error rate estimation section 23 will be explained more specifically. Here, as in the case of Embodiment 1, suppose four average signal point vectors of a QPSK modulated signal are expressed as (±a, ±a) and a 64-value QAM signal with the same power as that of this QPSK signal is received. In this case, the I and Q components of the signal amplitude of the 64-value QAM signal take eight values $\pm a/\sqrt{21}$, $\pm 3a/\sqrt{21}$, $\pm 5a/\sqrt{21}$, and $\pm 7a/\sqrt{21}$ as shown in FIG. 11. Therefore, thresholds to identify the respective signal points are set at a distance of $a/\sqrt{21}$ from the respective signal points as expressed by dotted lines in FIG. 11.

A gray-coded 64-value QAM generally places 64 signal points according to the content of 6-bit data representing 1 symbol, but the average distance between a plurality of signal points corresponding to the respective 6 bits is classified into three categories and bit error rates of the respective bits can also be classified into three categories accordingly. Suppose these three bit error rates are represented as Pe1, Pe2 and Pe3. Then, the relationship among these three can be expressed in the following expression (7):

$$Pe1:Pe2:Pe3=1:2:4 \quad (7)$$

Of these three, Pe3 which has the largest error rate has a relationship with the amplitude decision error rate Pa that enters the neighboring signal point area beyond the threshold at the respective signal points of the 64-value QAM expressed by the following expression (8)

$$Pe3=(\tfrac{1}{2})Pa \quad (8)$$

Then, the threshold calculation section 25B sets thresholds at a distance of $a/\sqrt{21}$ from the signal points ($\pm a$, $\pm a$) toward the I-axis and Q-axis, respectively. Then, when the I and Q components of the received symbols of the sequentially received QPSK modulated signals exceed this threshold, that is, the I and Q components of the received symbols enter the shaded area in FIG. 12, the threshold decision section 24A decides as in simulation that an amplitude decision error has occurred. Then, the counter 24B counts this amplitude decision error count Na and total decision count N.

The simulated BER calculation section 26 calculates the amplitude decision error rate Pa from the amplitude decision error count Na and total decision count N as expressed in the following expression (9):

$$Pa=Na/N \quad (9)$$

Then, the correction section 17 calculates the overall reception bit error rate Pe of a 64-value QAM based on Expressions (7), (8) and (9) as shown in the following Expression (10):

$$\begin{aligned} Pe &= (Pe1 + Pe2 + Pe3)/3 \quad (10)\\ &= ((1/4)Pe3 + (1/2)Pe3 + Pe3)/3 \\ &= (7/12)Pe3 \\ &= (7/24)Pa \end{aligned}$$

Thus, when the calculation results of the simulated bit error rate Pe of the 64-value QAM signal from the demodulated I and Q components of the QPSK modulated signal are plotted, they show a characteristic represented by marks Δ in FIG. 9 and it is possible to confirm that this characteristic substantially matches the reception bit error rate characteristic (single-dot dashed line) when a 64-value QAM signal is actually received in the same reception power environment.

Thus, according to the above-described configuration, a simulated bit error rate of a 64-value QAM signal is determined by calculating thresholds on the IQ plane based on the average positions of the I and Q components when the received QPSK modulated signal is demodulated and the theoretical distribution position of the 64-value QAM signal on the IQ plane and deciding the I and Q components of the sequentially received QPSK modulated signals using these thresholds, and therefore it is possible to determine the bit error rate speedily and accurately when a 64-value QAM signal instead of a QPSK modulated signal is transmitted through the same transmission path.

As a result, when the transmitting side changes the modulation system from a QPSK modulation system to a 64-value QAM modulation system, it is possible to perform speedy changeover without increasing transmission errors involved in the changeover.

(Embodiment 3)

Figure 13:
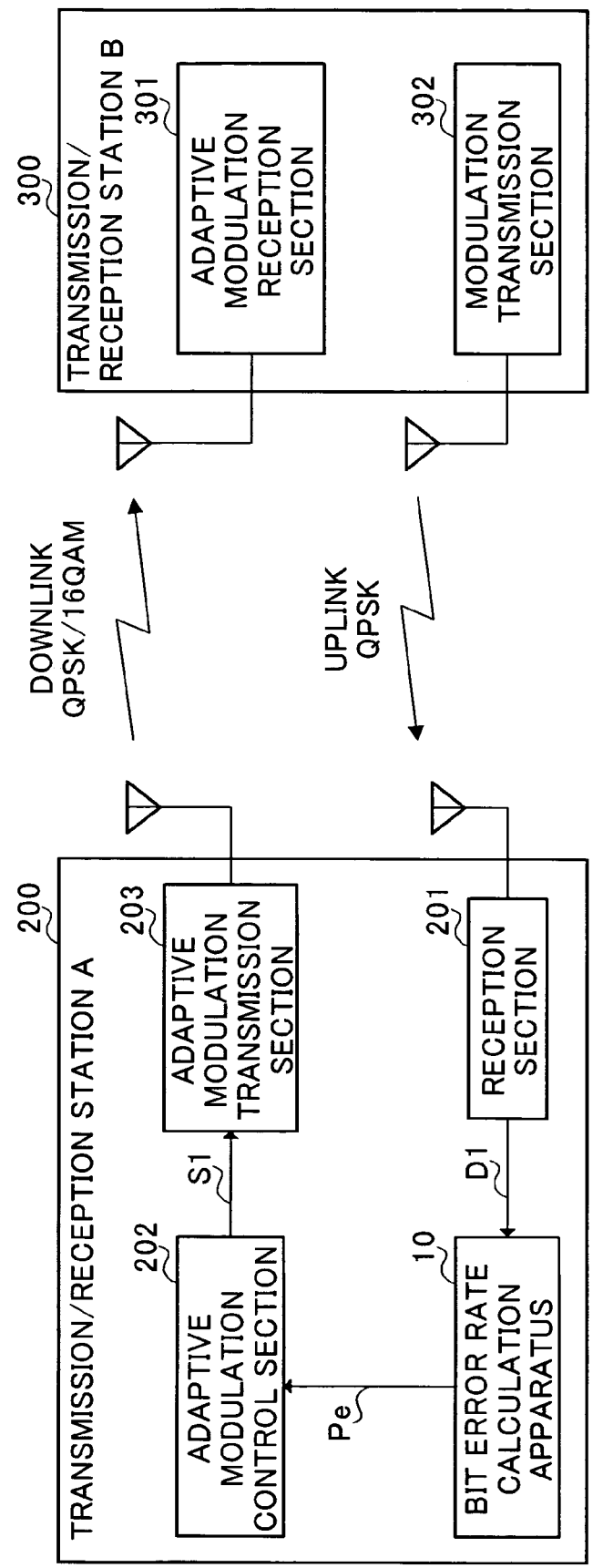
FIG. 13 is a block diagram showing a configuration of a communication system according to Embodiment 3.

FIG. 13 shows a configuration of a communication system 100 according to Embodiment 3 in which a transmission/reception station A 200 and transmission/reception station B 300 carry out bi-directional radio communications through the same frequency channel based on a Time Division Duplex (TDD) system. In this embodiment, suppose the transmission/reception station A 200 represents a radio base station and the transmission/reception station B 300 represents a mobile terminal. Therefore, a communication link from the transmission/reception station A 200 to the transmission/reception station B 300 is a downlink and the opposite communication link is an uplink.

The communication system 100 adaptively changes its modulation system according to the quality of the communication link for the downlink and carries out a communication based on a fixed modulation system irrespective of the communication quality for the uplink. Thus, the communication system 100 can increase the communication transmission capacity of the downlink.

The transmission/reception station A200 includes the bit error rate calculation apparatus 10 described in Embodiment 1. When a QPSK modulated signal is received at a reception section 201, the transmission/reception station A 200 applies down-conversion processing and signal level adjustment processing, etc., to this signal and then sends the signal to the bit error rate calculation apparatus 10.

As shown above, the bit error rate calculation apparatus 10 estimates a simulated bit error rate of a 16-value QAM signal from the received QPSK modulated signal D1 and sends the estimated bit error rate Pe to an adaptive modulation control section 202. The adaptive modulation control section 202 forms a changeover control signal S1 for changing the modulation system to be used for downlink transmission based on the estimated bit error rate Pe and sends this to an adaptive modulation transmission section 203.

When the estimated bit error rate Pe is smaller than a predetermined value, the adaptive modulation control section 202 outputs a changeover control signal S1 for instructing a changeover of the modulation system to the 16-value QAM modulation system, and when the estimated bit error rate Pe is greater than the predetermined value, the adaptive modulation control section 202 outputs a changeover control signal S1 for instructing a changeover of the modulation system to the QPSK modulation system.

The adaptive modulation transmission section 203 is constructed in such a way as to be able to selectively perform either QPSK modulation processing or 16-value QAM modulation processing and changes the modulation system adaptively according to the changeover control signal S1. This embodiment is designed to perform modulation and transmission by switching between QPSK and 16-value QAM in burst units.

An adaptive demodulation reception section 301 of the transmission/reception station B 300 adaptively receives and demodulates a QPSK modulated signal or 16-value QAM signal sent from the transmission/reception station A 200. For this reason, the adaptive demodulation reception section 301 needs to identify whether the received signal is a QPSK modulated signal or 16-value QAM signal. Thus, according to this embodiment, the adaptive modulation transmission section 203 inserts a symbol to identify the modulation system in a transmission burst beforehand and the adaptive demodulation reception section 301 changes the demodulation system based on this symbol.

A modulation transmission section 302 forms an uplink transmission signal based on the QPSK modulation system.

By the way, in the case of this embodiment, both the downlink and uplink transmit signals with the same transmit power.

In the above-described configuration, the communication system 100 adaptively switches between QPSK modulation and 16-value QAM modulation according to communication quality. In this case, the communication system 100 grasps the communication quality of the downlink based on the communication quality of the uplink and changes the modulation system according to the situation.

That is, since the communication system 100 uses the same frequency channel for the downlink and the uplink based on the TDD system, it is possible to consider the commutation quality of the uplink substantially equal to that of the downlink. Thus, the transmission/reception station A200 of the communication system 100 measures the reception quality of the uplink signal and estimates this as equivalent to the communication quality of the downlink.

Furthermore, the communication system 100 calculates a simulated bit error rate Pe of a 16-value QAM signal at the bit error rate calculation apparatus 10 from the received QPSK modulated signal in measuring the communication quality of the uplink.

This makes it possible to calculate a bit error rate speedily and accurately when a 16-value QAM signal instead of a QPSK modulated signal is transmitted through the same transmission path. As a result, when the communication system 100 switches between the QPSK modulation system and 16-value QAM modulation system, it is possible to realize speedy changeover without increasing transmission errors involved in the changeover and increase the communication capacity while keeping the communication quality high.

Thus, the above-described configuration provides the bit error rate calculation apparatus 10, calculates a simulated bit error rate Pe of the 16-value QAM signal from the QPSK modulated signal received by the bit error rate calculation apparatus 10 and adaptively changes the modulation system according to the bit error rate Pe, and can thereby realize the communication system 100 with improved communication quality and increased communication capacity.

Furthermore, the communication system 100 based on a Time Division Duplex (TDD) system performs modulation system changeover processing based on the simulated bit error rate Pe, and can thereby calculate the simulated bit error rate Pe in a reception environment having the same communication quality as that of the transmission environment, perform modulation system changeover processing more suitable for the transmission path environment and further improve the communication quality.

(Embodiment 4)

Figure 14:
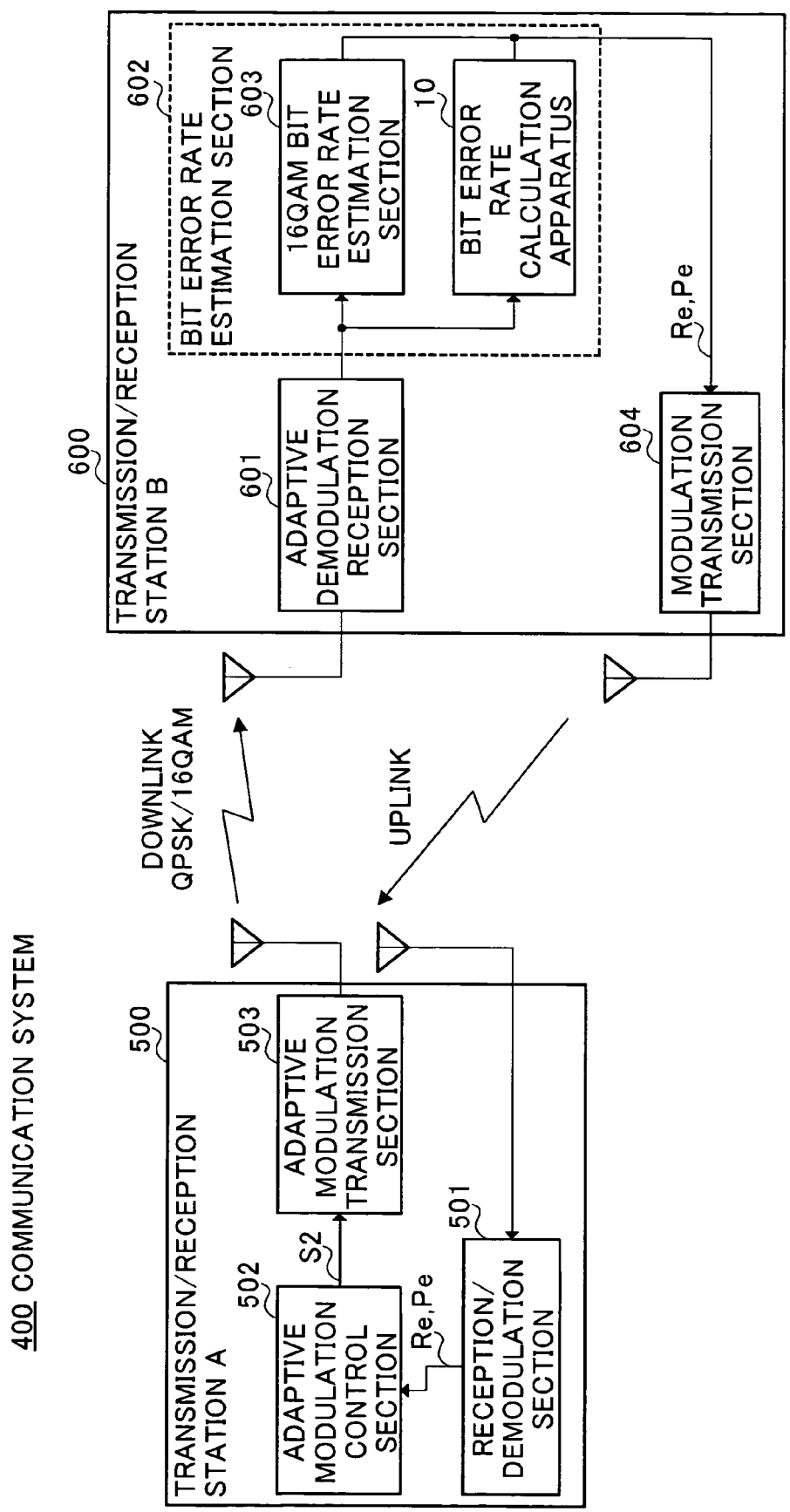
FIG. 14 is a block diagram showing a configuration of a communication system according to Embodiment 4.

FIG. 14 shows a configuration of a communication system 400 according to Embodiment 4 in which a transmission/reception station A 500 and transmission/reception station B 600 carry out bi-directional radio communications through different frequency channels based on a Frequency Division Duplex (FDD) system. In this embodiment, suppose the transmission/reception station A 500 represents a radio base station and the transmission/reception station B 600 represents a mobile terminal. Therefore, a communication link from the transmission/reception station A 500 to the transmission/reception station B 600 is a downlink and the opposite communication link is an uplink.

For the downlink, the communication system 400 adaptively changes its modulation system according to the quality of the communication link, and for the uplink, it carries a communication based on a fixed modulation system irrespective of the communication quality. Thus, the communication system 400 can increase the communication transmission capacity of the downlink.

The transmission/reception station B 600 includes the bit error rate calculation apparatus 10 described in Embodiment 1. An adaptive demodulation reception section 601 of the transmission/reception station B 600 demodulates the received QPSK modulated signal or 16-value QAM signal. In this case, the adaptive demodulation reception section 601 changes the demodulation system based on a symbol to identify the modulation system inserted beforehand in a transmission burst by an adaptive modulation transmission section 503.

When the received signal is a 16-value QAM signal, the adaptive demodulation reception section 601 sends the demodulated signal to the 16-value QAM bit error rate estimation section 603 of the bit error rate estimation section 602. On the other hand, when the received signal is a QPSK modulated signal, the adaptive demodulation reception section 601 sends the demodulated signal to the bit error rate calculation apparatus 10.

The 16-value QAM bit error rate estimation section 603 re-codes the received signal which has been subjected to error correcting coding processing and decoded once by the adaptive demodulation reception section 601, compares this re-coded data with a received coding string to estimate a bit error rate Re. Then, the 16-value QAM bit error rate estimation section 603 sends this to a modulation transmission section 604 as a bit error rate report value Re.

The bit error rate calculation apparatus 10 estimates a simulated bit error rate Pe of the 16-value QAM signal from the QPSK modulated signal received as shown above. Then, the bit error rate calculation apparatus 10 sends this to the modulation transmission section 604 as a simulated bit error rate report value Pe.

The modulation transmission section 604 modulates the uplink signal according to, for example, QPSK modulation and sends the uplink signal with bit error rate report values Re and Pe inserted therein. The bit error rate report values Re and Pe may also be inserted in specific locations in a transmission burst, for example, or may also be incorporated when the transmission data is constructed in an upper layer.

A reception/demodulation section 501 of the transmission/reception station A 500 receives/demodulates the uplink signal from the transmission/reception station B 600 to obtain received data. In this case, the reception/demodulation section 501 extracts the bit error rate report values Re and Pe inside the received data and sends it to the adaptive modulation control section 502.

The adaptive modulation control section 502 outputs a change over control signal S2 for changing the modulation system to be used for downlink transmission based on the bit error rate report values Re and Pe. In practice, when the bit error rate report values Re and Pe are smaller than a predetermined value, the adaptive modulation control section 502 outputs the changeover control signal S2 for selecting/instructing a 16-value QAM modulation system. On the other hand, when the bit error rate report values Re and Pe are greater than a predetermined value, the adaptive modulation control section 502 outputs the changeover control signal S2 for selecting/instructing a QPSK modulation system. The adaptive modulation/transmission section 503 changes the modulation system based on this changeover control signal S2, modulates and sends the signal.

Here, it is generally relatively easy to calculate a bit error rate of a 16-value QAM signal and change the modulation system from 16-value QAM modulation to QPSK modulation when the value exceeds the predetermined value. This is because 16-value QAM modulation is a modulation system with a higher bit error rate than QPSK modulation and it only takes a short time to perform processing of detecting that the bit error rate exceeds the predetermined value and changing the modulation system to QPSK modulation.

On the contrary, it takes a long time to perform processing of calculating the bit error rate of the QPSK modulated signal and changing the modulation system from QPSK modulation to 16-value QAM modulation when the bit error rate value falls below the predetermined value as described above. Considering this, by providing the bit error rate calculation apparatus 10, the communication system 400 can change the modulation system from QPSK modulation to 16-value QAM modulation speedily.

Thus, according to the above-described configuration, the transmission/reception station B 600 that communicates with the transmission/reception station A 500 carrying out adaptive modulation transmission is provided with the 16-value QAM bit error rate estimation section 603 and bit error rate calculation apparatus 10 so that the bit error rate report values Re and Pe are sent to the transmission/reception station A 500, and it is therefore possible to realize the communication system 400 capable of performing adaptive modulation processing speedily and accurately.

(Embodiment 5)

This embodiment proposes that the communication quality estimation method according to the present invention should be applied to a communication system that makes an Automatic Repeat Request (ARQ).

(1) Explanation of Automatic Repeat Request

Before explaining a configuration of this embodiment, an Automatic Repeat Request system will be explained first. The Automatic Repeat Request system is a communication system in which the receiving side is provided with a function of detecting errors in the received data, replies a communication acknowledgment signal (ACK/NACK signal) indicating the presence/absence of errors in the received data to the transmitting side, and if this communication acknowledgment signal is a NACK signal, the transmitting side resends the data, thus making the reliability of a communication link more reliable.

This Automatic Repeat Request system sends only a minimum communication acknowledgment signal through a return link, which is a reverse communication of data transmission, requires an extremely small amount of traffic of the return link, and therefore it is suitable for a communication system with so-called asymmetric traffic, in which traffic is concentrated on a forward link which is a communication in the data transmission direction.

Here, suppose a case where an adaptive communication system that adaptively switches the modulation system between QPSK and 16-value QAM is applied to a communication system that adopts an ARQ system. Assuming the case where it is not possible to secure the amount of traffic enough to transmit information of communication quality on the downlink, suppose a system required to send a communication acknowledgment signal immediately after error detection during downlink reception.

Assume a case where a situation of a communication acknowledgment signal (ACK/NACK) from a terminal station to a base station is used as a parameter indicative of downlink communication quality. For example, when a 16-value QAM-based communication is in progress, the base station monitors the situation of this communication acknowledgment signal and the frequency of NACK exceeds a predetermined rate for communication acknowledgment signals corresponding in number to the last several bursts, the base station decides that the communication quality of the downlink has deteriorated and can change the modulation system to QPSK which is relatively more resistant to errors.

On the contrary, assuming a case of deciding a changeover from QPSK to 16-value QAM, since QPSK is highly resistant to errors, if communication quality is good to a certain degree an ACK (no errors) state may continue for communication acknowledgment signals corresponding to several bursts. In this situation, when the modulation system is changed to 16-value QAM, it is not possible to know whether reception errors occur or not from the communication acknowledgment signal about QPSK.

Thus, when a modulation system such as QPSK whose bit error rate is relatively lower than that of 16-value QAM is changed to a modulation system such as 16-value QAM whose bit error rate is relatively higher than that of QPSK, a general communication system that carries out adaptive modulation and automatic repeat request fails to obtain information on appropriate communication quality in the changed modulation system and cannot obtain decision information appropriate for changing the modulation system.

(2) Configuration, Operation and Effects of Embodiment 5

Thus, this embodiment proposes that the communication quality estimation method of the present invention should be applied to a communication system that carries out adaptive modulation and automatic repeat request.

Figure 15:
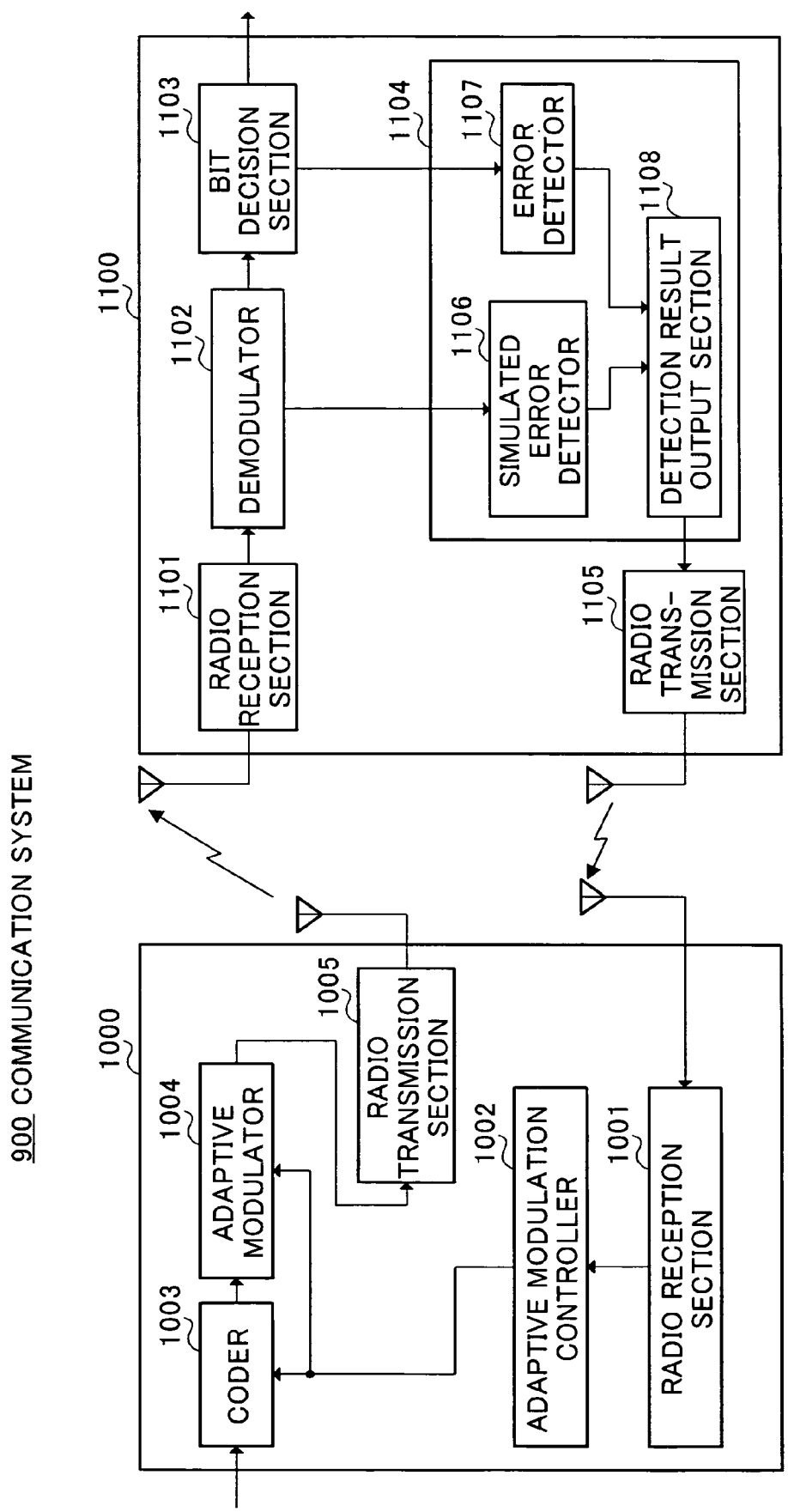
FIG. 15 is a block diagram showing a configuration of a communication system according to Embodiment 5.

FIG. 15 shows a configuration of a communication system 900 according to Embodiment 5. This embodiment will describe a case of the communication system 900 in FIG. 15 where a communication apparatus 1000 as a base station apparatus communicates with a communication apparatus 1100 as a communication terminal apparatus and the modulation system of communication in which data is transmitted from the communication apparatus 1000 to the communication apparatus 1100 is switched. Hereafter, a communication link from the communication apparatus 1000 to the communication apparatus 1100 will be explained as a downlink and a reverse communication link will be explained as an uplink.

The communication system in this embodiment has a configuration in which the communication transmission capacity on the downlink is increased by adaptively changing the modulation system according to the quality of a transmission path environment. In this embodiment, suppose a case where two types of modulation system are switched round adaptively and a relationship of Da>Db holds between average signal points distances Da and Db of the respective modulation systems. In this case, assuming that both systems have the same modulation band, there is a relationship in which the modulation system B generally has a higher transfer rate and a greater required C/N (C/N value necessary to realize the same bit error rate) than the modulation system A. As a specific example, assume QPSK as the modulation system A and 16-value QAM as the modulation system B.

In FIG. 15, the communication apparatus 1000 is mainly constructed of a radio reception section 1001, an adaptive modulation controller 1002, a coder 1003, an adaptive modulator 1004 and a radio transmission section 1005. On the other hand, the communication apparatus 1100 is mainly constructed of a radio reception section 1101, a demodulator 1102, a bit decision section 1103, an error detection section 1104 and a radio transmission section 1105. Furthermore, the error detection section 1104 is mainly constructed of a simulated error detector 1106, an error detector 1107 and a detection result output section 1108.

Here, the simulated error detector 1106 has a similar configuration as that of the bit error rate estimation section 13 of Embodiment 1 except that the simulated error detector 1106 estimates not a bit error rate but a bit error as opposed to the bit error rate estimation section 13 of Embodiment 1 that estimates a simulated bit error rate, assuming that data is transmitted with a modulation system with lower error resistance than the modulation system currently being used for communication.

Figure 16:
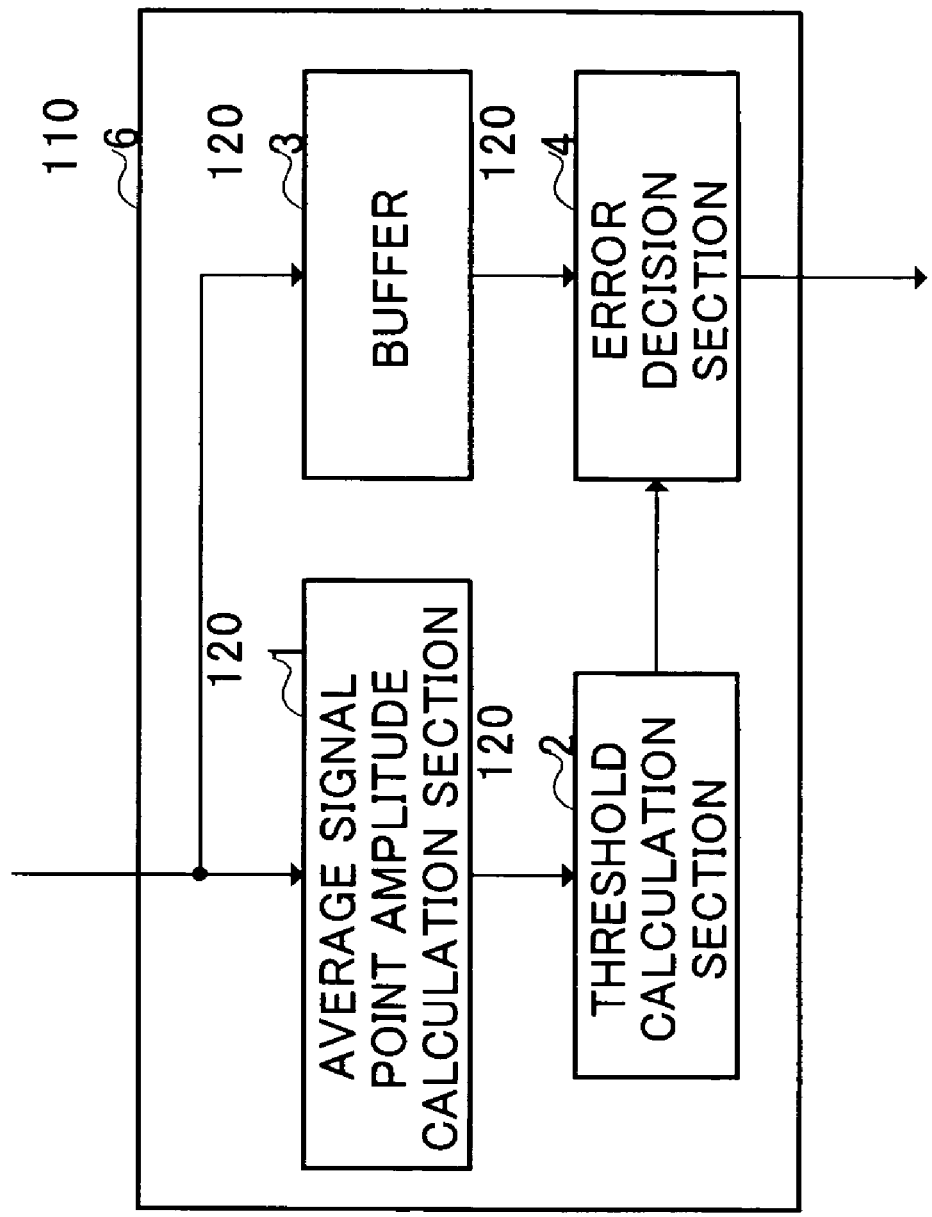
FIG. 16 is a block diagram showing a configuration of a simulated error detector according to Embodiment 5.

The simulated error detector 1106 has a configuration as shown in FIG. 16. That is, an average signal point amplitude calculation section 1201 detects an average amplitude on the IQ plane using orthogonal IQ vector information sequentially input from the demodulator 1102 (FIG. 15) and outputs the average amplitude to a threshold calculation section 1202. Here, suppose the average amplitude means not the length of an IQ vector on the IQ plane but the I and Q vector components, that is, the distance from the Q-axis and the distance from the I-axis as in the case of Embodiment 1.

When signals are transmitted based on a modulation system with lower error resistance than the modulation system currently being used for communication, the threshold calculation section 1202 calculates the range of signal point positions in which the signals can be received correctly from the average amplitude and outputs the calculation result to an error decision section 1204.

A buffer 1203 temporarily stores information of the orthogonal IQ vector input from the demodulator 1102 and outputs it to the error decision section 1204.

The error decision section 1204 sets the range of the signal point positions where signals can be received correctly when signals are transmitted according to a modulation system with lower error resistance than the modulation system currently being used for communication, from the average amplitude and decides, and when the IQ vector of the demodulated received signal is not found within this range, the error decision section 1204 decides that an error occurs, and carries out an error decision in simulation assuming that transmission is performed according to a modulation system with lower error resistance than the modulation system currently used for communication.

More specifically, the error decision section 1204 decides whether the amplitude values of the I and Q components of the orthogonal IQ vector information of QPSK modulated signals are within a threshold range or not and thereby makes an error decision on (amplitude bits of) 16-value QAM signals in simulation.

As a result, with the configuration as shown in FIG. 16, it is possible to obtain similar effects to those of the bit error rate estimation section 13 explained in Embodiment 1.

Returning to FIG. 15, the communication system 900 of this embodiment will be explained again. The radio reception section 1001 receives a radio signal, amplifies, frequency-converts and demodulates the radio signal and outputs an ACK signal or NACK signal included in the received signal obtained to the adaptive modulation controller 1002. Here, the ACK signal is a signal indicating that the transmitted data has been received correctly and the NACK signal is a signal indicating that the transmitted data contains errors and could not be received correctly. For example, the radio reception section 1001 receives a 16-value QAM communication acknowledgment signal (ACK signal or NACK signal) sent from the communication apparatus 1100 and outputs the reception result to the adaptive modulation controller 1002.

The adaptive modulation controller 1002 decides whether or not to change the modulation system from the ACK signal and NACK signal and outputs an instruction for a change of the modulation system to the coder 1003 and adaptive modulator 1004. More specifically, the adaptive modulation controller 1002 calculates the frequency of NACK signals from the number of times ACK signal and NACK signal are received and decides whether or not to change the modulation system based on the frequency of NACK signals.

For example, when data is modulated according to 16-value QAM and sent, the adaptive modulation controller 1002 decides, when the frequency of NACK falls below a predetermined number of times in past 10 bursts, that the communication quality of the downlink is good and selects the 16-value QAM modulation system. Furthermore, when the frequency of NACK exceeds the predetermined number of times, the adaptive modulation controller 1002 decides that the communication quality of the downlink is bad and selects the QPSK modulation system.

The coder 1003 subjects the data to be transmitted to error detection/coding and outputs it to the adaptive modulator 1004. For example, the coder 1003 carries out CRC-coding on the data to be transmitted. Then, when an instruction for changing the modulation system is received from the adaptive modulation controller 1002, the coder 1003 changes the number of bits of the data to be coded according to the number of bits of the data to be transmitted according to the modulation system to be used.

The adaptive modulator 1004 modulates the data coded by the coder 1003 and outputs it to the radio transmission section 1005. Then, the adaptive modulator 1004 changes the modulation system of the data according to the instruction for the change of the modulation system output from the adaptive modulation controller 1002. The radio transmission section 1005 converts the data modulated by the adaptive modulator 1004 to a radio frequency, amplifies and transmits the radio signal obtained.

The radio reception section 1101 receives and amplifies a radio signal and converts it to a baseband frequency and outputs the received signal obtained to the demodulator 1102.

The demodulator 1102 demodulates the received signal output from the radio reception section 1101 according to the modulation system used when the communication apparatus 1000 modulated the transmission data. The IQ vector of the symbols of the received signal obtained through the demodulation processing is output to the simulated error detector 1106 that, in simulation, estimates the communication quality of a signal modulated according to 16-value QAM and sent. Furthermore, the demodulation result is output to the bit decision section 1103. The bit decision section 1103 performs a hard decision on the demodulation result output from the demodulator 1102 and outputs the hard decision result to the error detector 1107.

The error detector 1107 detects an error rate of the received signal through error detection processing using, for example, CRC and outputs the detection result to the detection result output section 1108. On the other hand, the simulated error detector 1106 estimates whether errors will occur or not during reception when data is transmitted according to a modulation system that will possibly be changed in the current reception situation from the IQ vectors of symbols of the received signal output from the demodulator 1102 and outputs the estimated detection result to the detection result output section 1108.

More specifically, when a signal modulated according to 16-value QAM is received, the error detection section 1104 directly detects errors of 16-value QAM using the demodulation result through the error detector 1107. On the other hand, when a signal modulated according to QPSK is received, the error detection section 1104 estimates, in simulation, as to whether error will occur if data is transmitted according to 16-value QAM in the same reception situation using the IQ vector information of signal points of the received signal through the simulated error detector 1106 and outputs the estimation result as the simulated error detection result.

When signals are transmitted according to a modulation system with low error resistance, the detection result output section 1108 outputs the error detection result by the error detector 1107 to the radio transmission section 1105. On the other, when signals are transmitted according to a modulation system with high error resistance, the detection result output section 1108 outputs the simulated error detection result by the simulated error detector 1106 to the radio transmission section 1105.

More specifically, in the case of 16-value QAM, the detection result output section 1108 outputs the error detection result obtained by the error detector 1107, and in the case of QPSK, the detection result output section 1108 outputs the simulated error detection result obtained by the simulated error detector 1106, and therefore the detection result output section 1108 outputs detection results as the 16-value QAM error detection result in both cases.

The radio transmission section 1105 modulates, converts the error detection result output from the detection result output section 1108 to a radio frequency, amplifies and sends the radio signal obtained. For example, the radio transmission section 1105 sends a communication acknowledgement signal (ACK/NACK) according to a 16-value QAM modulation system through the uplink based on the 16-value QAM error detection result. Here, suppose ACK indicates that transmission has been successful and NACK indicates that transmission has failed.

Then, the operation of the communication system 900 according to this embodiment will be explained.

First, a case where the communication apparatus 1100 receives a QPSK modulated signal will be explained. At this time, the detection result output section 1108 outputs the simulated error detection result on 16-value QAM obtained by the simulated error detector 1106. The radio transmission section 1105 sends a simulated ACK/NACK signal about a 16-value QAM signal based on this simulated error detection result.

When the frequency of ACK signals is higher than a predetermined value, the communication apparatus 1000 changes the modulation system from QPSK modulation to 16-value QAM. On the contrary, when the frequency of NACK signals is higher than the predetermined value, the communication apparatus 1000 continues to use QPSK modulation as the modulation system.

Then, a case where the communication apparatus 1100 receives a 16-value QAM modulation signal will be explained. At this time, the detection result output section 1108 outputs the actual error detection result on 16-value QAM obtained by the error detector 1107. The radio transmission section 1105 sends an ACK/NACK signal about a 16-value QAM signal based on this actual error detection result.

When the frequency of ACK signals is higher than a predetermined value, the communication apparatus 1000 continues to use 16-value QAM as the modulation system. On the contrary, when the frequency of NACK signals is higher than the predetermined value, the communication apparatus 1000 changes the modulation system from 16-value QAM to QPSK modulation.

Thus, before the modulation system for adaptive modulation of the communication apparatus 1000 is changed from QPSK modulation to 16-value QAM, it is possible to obtain appropriate information as to whether a communication environment suitable for a 16-value QAM communication is in place or not.

According to the above-described configuration, by applying the communication quality estimation method according to the present invention to a communication system that carries out adaptive modulation and automatic repeat request and by notifying the communication partner of the communication quality estimated assuming a change of the modulation system to one having higher bit error rate than the modulation system currently being used in communication, it is possible to decide whether or not errors will occur in the received data if the modulation system is changed to a modulation system with higher bit error rate than that of the modulation system being used for communication before the changeover of the modulation system. As a result, it is possible to carry out appropriate changeover processing without increasing transmission errors involved in the changeover.

By the way, when a signal is transmitted according to QPSK, there is no particular constraint on operations related to whether or not to perform error detection of the demodulation result itself of the signal transmitted by QPSK and whether or not to transmit a communication acknowledgment signal.

Furthermore, when applied to a communication system in which a communication acknowledgement signal is sent through the uplink and an automatic repeat request (ARQ) is performed, it is also possible to send both an error detection result in a modulation system used for a communication and a simulated error detection result according to a modulation system to which the modulation system is to be changed during ACK transmission. Furthermore, the method of transmitting the error detection result and the simulated error detection result is not particularly limited. The results may be transmitted through different communication paths or may be multiplexed and transmitted through a single communication path. Furthermore, the frame configuration, etc., is not particularly limited.

Furthermore, the modulation system used for uplink transmission according to this embodiment is not particularly limited and it is preferable to use a modulation system capable of securing sufficient reliability of a communication when an ACK signal is transmitted.

(Embodiment 6)

This embodiment proposes a preferable configuration for a system in which data to be communicated is subjected to error correcting coding processing when a communication is carried out based on adaptive modulation through the downlink between the communication apparatus 1000 and communication apparatus 1100 according to Embodiment 5.

Figure 17:
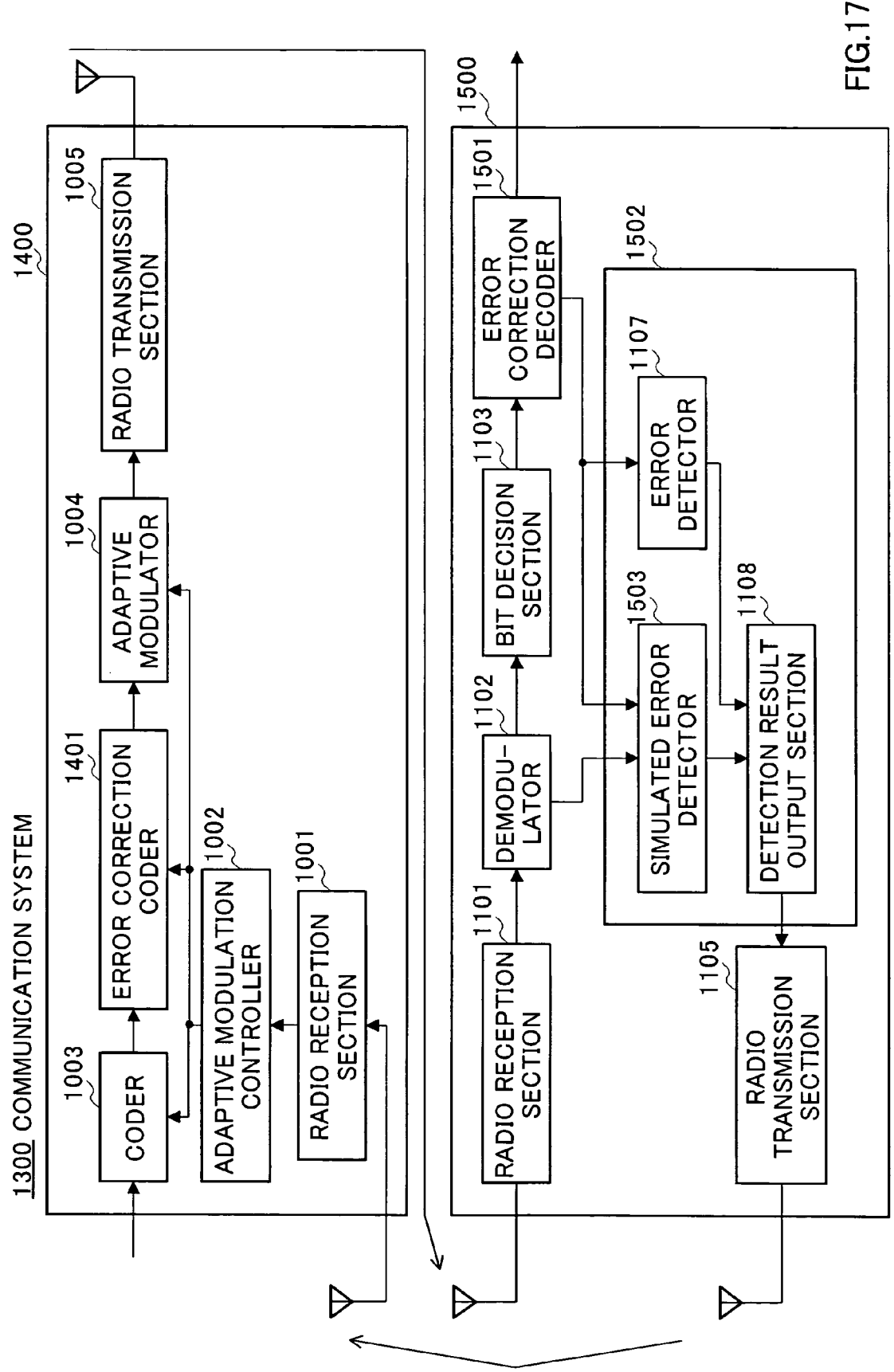
FIG. 17 is a block diagram showing a configuration of a communication system according to Embodiment 6.

FIG. 17 shows a configuration of a communication system 1300 according to Embodiment 6 of the present invention. However, the same components as those in FIG. 15 are assigned the same reference numerals as those in FIG. 15 and detailed explanations thereof will be omitted. A communication apparatus 1400 in FIG. 17 is different from the communication apparatus 1000 in FIG. 15 in that it includes an error correcting coder 1401 and applies adaptive modulation to error correcting coded transmission data.

Furthermore, a communication apparatus 1500 in FIG. 17 is different from the communication apparatus 1100 in FIG. 15 in that it includes an error correcting decoder 1501 and an error detection section 1502 and counts, when the modulation system is changed to a modulation system with a higher bit error rate than that of the modulation system currently being used for communication, the frequency with which errors occur in the received data and decides whether this frequency falls within an error-correctable range or not. Furthermore, the error detection section 1502 is mainly constructed of a simulated error detector 1503, an error detector 1107 and a detection result output section 1108.

In the communication apparatus 1400, a coder 1003 performs error detection coding on data to be transmitted and outputs the data to an error correcting coder 1401. For example, the coder 1003 performs CRC coding on the data to be transmitted. Then, when the coder 1003 receives an instruction for changing a modulation system from an adaptive modulation controller 1002, it changes the number of bits of data to be subjected to coding processing according to the number of bits of the data to be transmitted according to the modulation system used.

The error correcting coder 1401 carries out error correcting coding on the data coded at the coder 1003 and outputs the data to an adaptive modulator 1004. Block coding or convolutional coding, etc., can be used for this error correcting coding. This embodiment will describe BCH (63, 51), which is a kind of block coding as an example. This coding adds 12 parity bits to every input bit block of 51 bits and outputs a 63-bit block, and thereby provides codes for which errors of up to 2 bits in the block are correctable during decoding.

On the other hand, the error correcting decoder 1501 of the communication apparatus 1500 carries out error correcting decoding on a hard decision result obtained at a bit decision section 1103 and outputs the decoding result to the simulated error detector 1503 and the error detector 1107. This error correcting decoding is the decoding processing corresponding to the coding carried out by the error correcting coder 1401 of the communication apparatus 1400 and corresponds to the decoding processing of BCH (63, 51) in this embodiment. That is, error correcting decoding processing is carried out for every input bit block of 63 bits and outputs decoded data of a 51-bit block.

Figure 18:
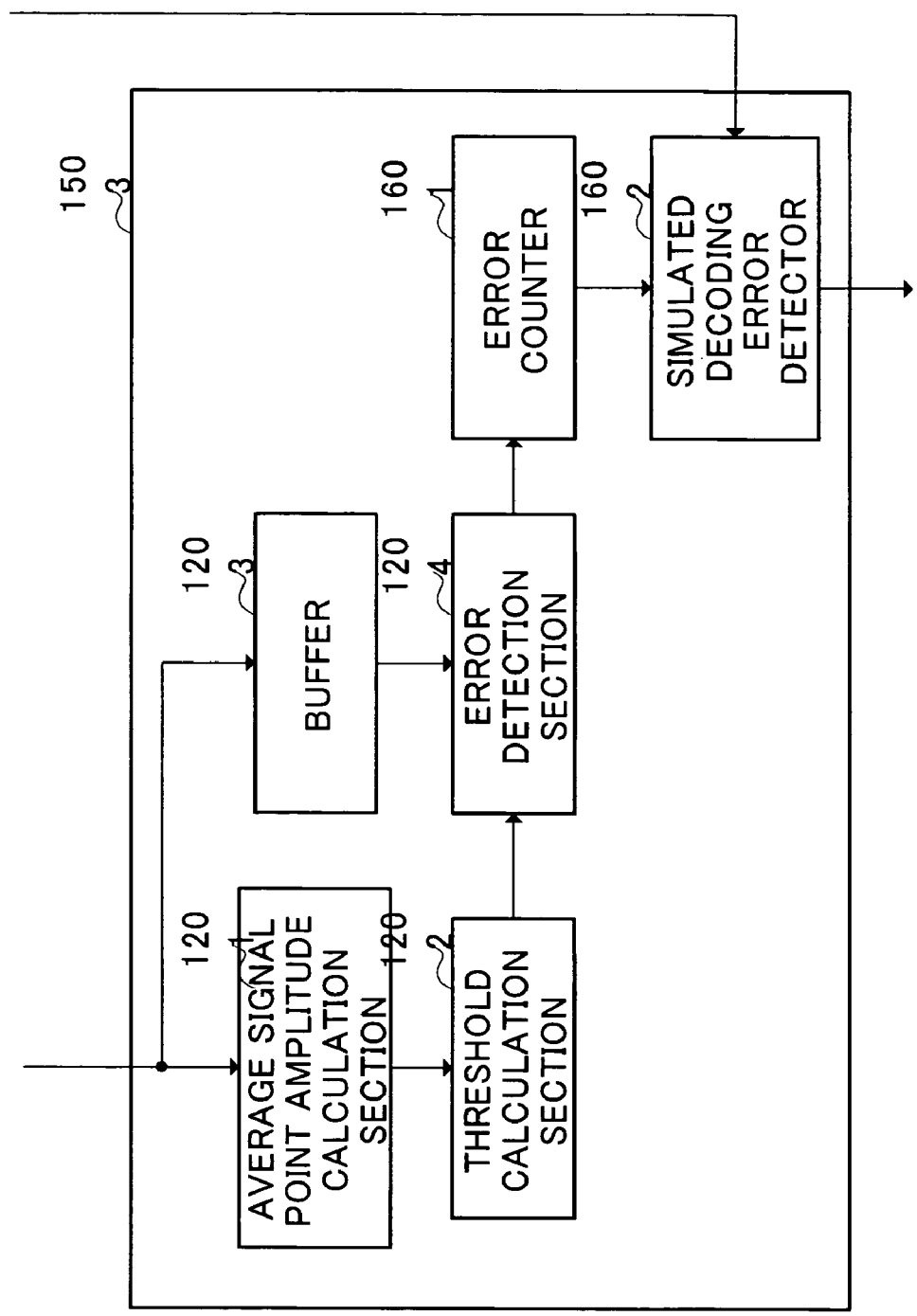
FIG. 18 is a block diagram showing a configuration of a simulated error detector according to Embodiment 6.

Then, a configuration of the simulated error detector 1503 of this embodiment will be explained. FIG. 18 shows a configuration of the simulated error detector 1503 of this embodiment and the same components as those in FIG. 16 are assigned the same reference numerals as those in FIG. 16 and detailed explanations thereof will be omitted. The simulated error detector 1503 is different from the simulated error detection 1106 in FIG. 16 in that it includes an error counter 1601 and a simulated decoding error detector 11602, and detects an error in simulation assuming a communication is carried out according to a modulation system to which the modulation system is to be changed based on the positions of symbols of the actually received signal and a distribution of symbols in the modulation system to which the modulation system is to be changed and decides whether the estimated error is correctable by error correcting decoding or not.

In this embodiment, the communication apparatus 1400 applies error detection coding using CRC codes on the transmission data first and then applies error correcting coding using BCH (63, 51) codes. Thus, by carrying out error detection processing based on CRC codes on the error correction decoding result and obtaining the error detection result, it is possible to detect remaining errors that escapes being corrected in the error correcting decoding processing with BCH codes.

The error counter 1601 counts the number of bits decided to be erroneous at an error decision section 1204 every predetermined bit segment and outputs the counting result. This embodiment assumes that the predetermined bit segment is a 63-bit segment that corresponds to 1 coding block of BCH (63, 51) codes.

The simulated decoding error detector 1602 receives the count value from the error counter 1601 and the number of error-correctable bits from the error correcting decoder 1501, decides whether the number of error bits counted by the error counter 1601 is correctable in every predetermined bit segment or not and outputs the decision result.

More specifically, when, for example, the number of error bits counted is equal to or smaller than the number of error-correctable bits through the error correcting decoding processing, the simulated decoding error detector 1602 decides that no error will occur in the received data when the modulation system is changed to a modulation system with a higher bit error rate than that of the modulation system currently being used for communication. On the contrary, when the number of counted error bits is greater than the number of error-correctable bits, the simulated decoding error detector 1602 decides that errors will occur in the received data when the modulation system is changed to a modulation system with a higher bit error rate than that of the modulation system currently being used for communication.

More specifically, when the number of bits decided to be erroneous for every BCH code block counted by the error counter 1601 corresponds to 2 bits or smaller which corresponds to the number of error-correctable bits of the BCH (63, 51) codes, the simulated decoding error detector 1602 decides that errors of this block will be corrected. On the contrary, when the counted number of bits decided to be erroneous exceeds 2 bits, the simulated decoding error detector 1602 decides that errors of this block cannot be corrected and some errors can remain.

Of the above-described decision on all BCH decoding of a received frame, if errors can remain in at least one block, the simulated decoding error detector 1602 decides that errors can occur in this frame. When no error can remain even in one block, the simulated decoding error detector 1602 decides no frame errors can occur. The above-described decision result is output as the simulated error detection result.

Thus, when the modulation system is changed to a modulation system with a higher bit error rate than that of the modulation system currently being used for communication, the communication apparatus of this embodiment counts the frequency of errors occurring in the received data and decides whether this frequency falls within an error-correctable range or not, and can thereby decide whether errors will occur in the received data or not also in the case of a communication using error correcting coding before changing the modulation system when the modulation system is changed to a modulation system with a higher bit error rate than that of the modulation system currently being used for communication.

More specifically, when the communication apparatus 1500 of this embodiment receives a QPSK modulated signal and estimates whether an error can occur or not when the signal is communicated according to 16-value QAM through the same transmission path, the communication apparatus 1500 can detect residual errors after error correction in simulation, by estimating whether errors beyond the error correcting capacity can occur or not.

As a result, even in a communication system using error correction coding, when the transmitting side changes the modulation system from a QPSK modulation system to a 16-value QAM modulation system, it is possible to perform appropriate changeover without increasing transmission errors involved in the changeover by changing the modulation system based on the error detection result after error correction decoding.

By the way, this embodiment assumes the case where a plurality of BCH blocks exists in a received frame and as a condition for simulated detection of residual errors, it is decided that residual errors can occur when simulated errors are detected even in one block in the frame, but the present invention is not limited to this and it is also possible to adopt a configuration in such a way that the system detects residual errors, for example, in every BCH block and uses the frequency of block errors in BCH block units.

(Other Embodiments)

The above-described embodiments have described the case where communication quality of a 16-value QAM signal is estimated in simulation when a signal based on QPSK modulation system is received, or communication quality of a 64-value QAM signal is estimated in simulation when a 16-value QAM modulated signal is received, but the present invention is not limited to this and applicable to any case where the communication quality of a modulation system with lower error resistance than that of the modulation system used for communication is estimated in simulation.

More specifically, it is possible to estimate the communication quality in simulation for any modulation system in which a relationship Da>Db holds, where an average distance between signal points of the modulation system used for communication is Da and an average distance between signal points of the modulation system whose communication quality is to be estimated in simulation is Db.

For example, Embodiment 1 is also applicable in the case of receiving a modulated signal with a greater distance between signal points than that of 16-value QAM such as BPSK modulated signal, π/4-shift DQPSK modulated signal, MSK modulated signal, GMSK modulated signal and GFSK modulated signal instead of a QPSK modulated signal corresponding to the modulation system in communication. Furthermore, the present invention is also applicable in the case of estimating communication quality of multi-value QAM with 16 or more values and a PSK modulated signal with 8 or more values in simulation.

When a π/4-shift DQPSK modulated signal or a differential-coded GMSK modulated signal is received, an orthogonal IQ vector similar to that of a QPSK modulated signal is obtained through delay detection of a received signal, and therefore applying the same processing as that of the above-described embodiment to this orthogonal IQ vector makes it possible to estimate the reception bit error rate and bit errors of a 16-value QAM in simulation. In this case, the error characteristic of delay detection is known to deteriorate compared to synchronous detection (more specifically, approximately 3 dB at required C/N), and therefore it is also possible to correct a BER estimated value based on this or correct the decision criteria for changeover control according to the frequency of NACK.

Here, a case will be explained here using FIG. 19, FIG. 20 and FIG. 21, where the communication quality of a signal modulated according to 64-value QAM is estimated, in simulation, based on the point positions of a 16-value QAM signal that is transmitted.

Figure 19:
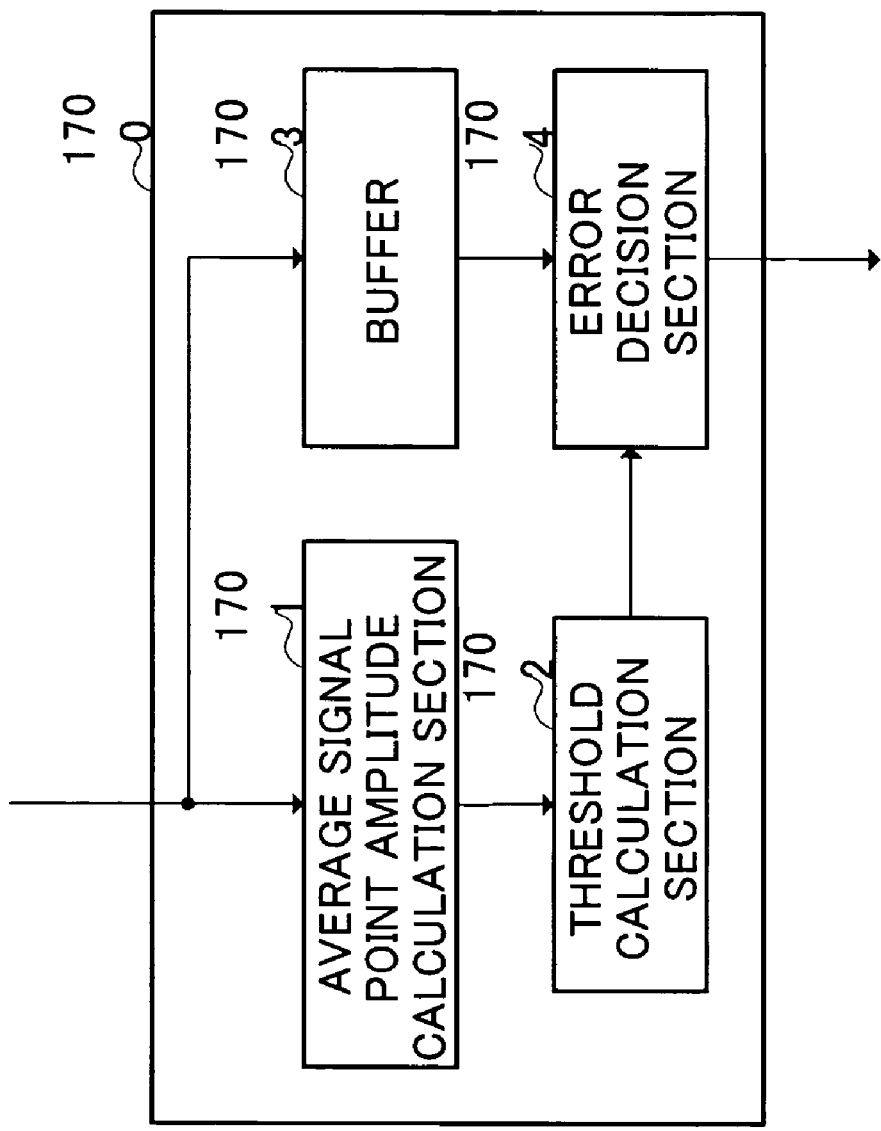
FIG. 19 is a block diagram showing a configuration of a simulated error detector according to another embodiment.

FIG. 19 shows a configuration of a simulated error detector 1700. Compared to the simulated error detector 1106 shown in FIG. 16, the simulated error detector 1700 has the same configuration except that processing in each block is different.

An average signal point amplitude calculation section 1701 detects an average amplitude of a received 16-value QAM signal on the IQ plane using orthogonal IQ vector information sequentially input from the demodulator 1102 (FIG. 15) and outputs the average amplitude to a threshold calculation section 1702. For example, the average signal point amplitude calculation section 1701 calculates an average value of absolute values of the I and Q components of each 16-value QAM input signal point vector and regards this average value as an average amplitude.

The threshold calculation section 1702 calculates a plurality of thresholds ths for the 64-value QAM signal based on a theoretical distribution state of the 64-value QAM signal on the IQ plane when the 64-value QAM signal is received with the same reception power as that when a 16-value QAM modulated signal is received and an average signal point amplitude a detected at the average signal point amplitude calculation section 1701.

A buffer 1703 temporarily stores information on the orthogonal IQ vector input from the demodulator 1102 (FIG. 15) and outputs it to an error decision section 1704.

The error decision section 1704 decides whether the amplitude values of the I and Q components of the orthogonal IQ vector information of the 16-value QAM modulated signal fall within the range of threshold ths or not and thereby carries out, in simulation, an error decision on the 64-value QAM signal (amplitude bits).

Figure 20:
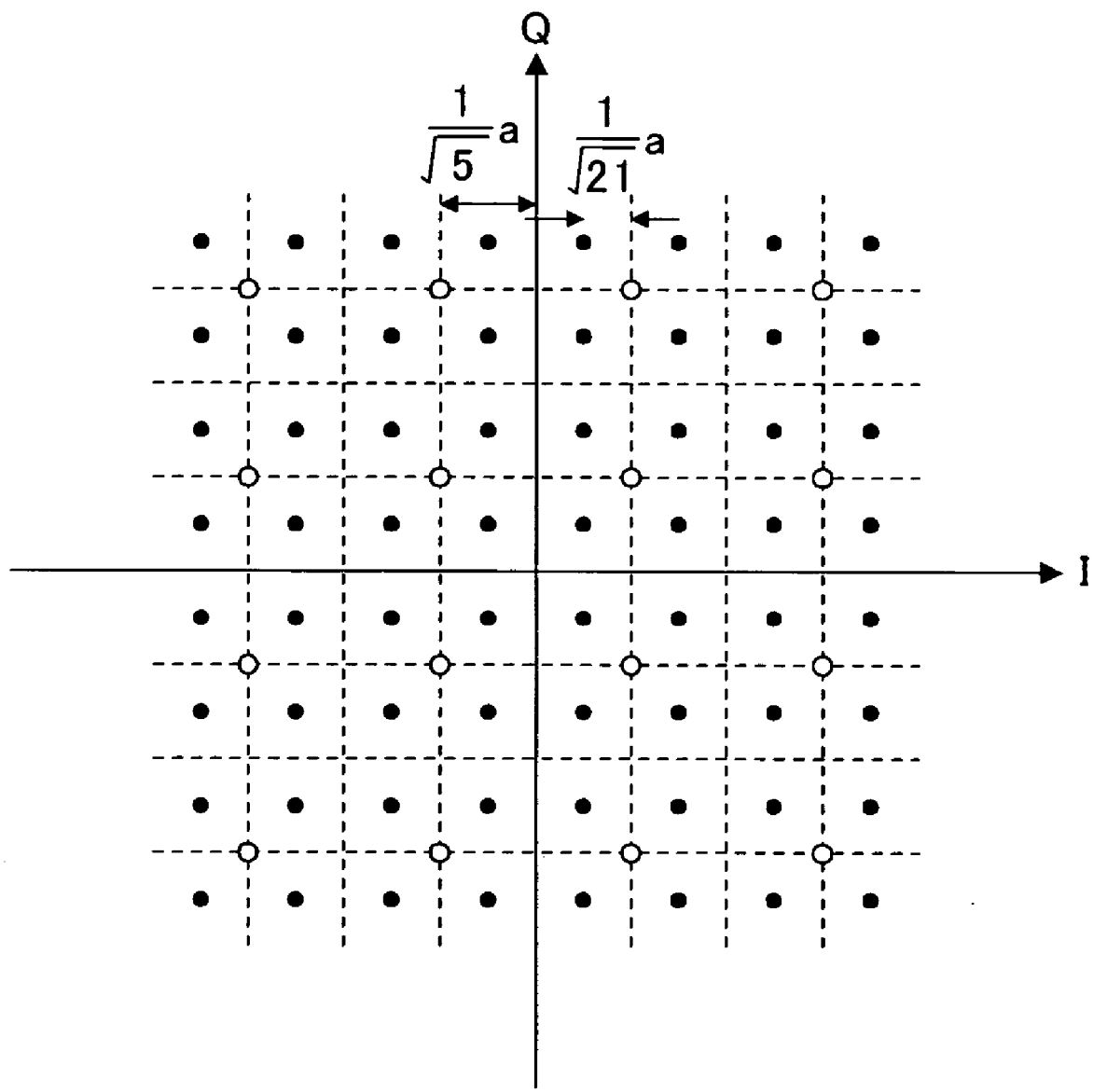
FIG. 20 illustrates an example of a signal point configuration of a 16-value QAM modulation system and 64-value QAM modulation system.

FIG. 20 shows an example of signal point configurations of a 16-value QAM modulation system and 64-value QAM modulation system. In the example in FIG. 20, error detection is performed assuming a case where a 64-value QAM signal with the same power as that of a 16-value QAM signal is received. In FIG. 20, assuming that an average signal point amplitude vector of the 16-value QAM modulated signal is (a, a), the I and Q components of each signal point of the 64-value QAM signal take 8 values of $\pm a/\sqrt{21}$, $\pm 3a/\sqrt{21}$, $\pm 5a/\sqrt{21}$, and $\pm 7a/\sqrt{21}$.

Figure 21:
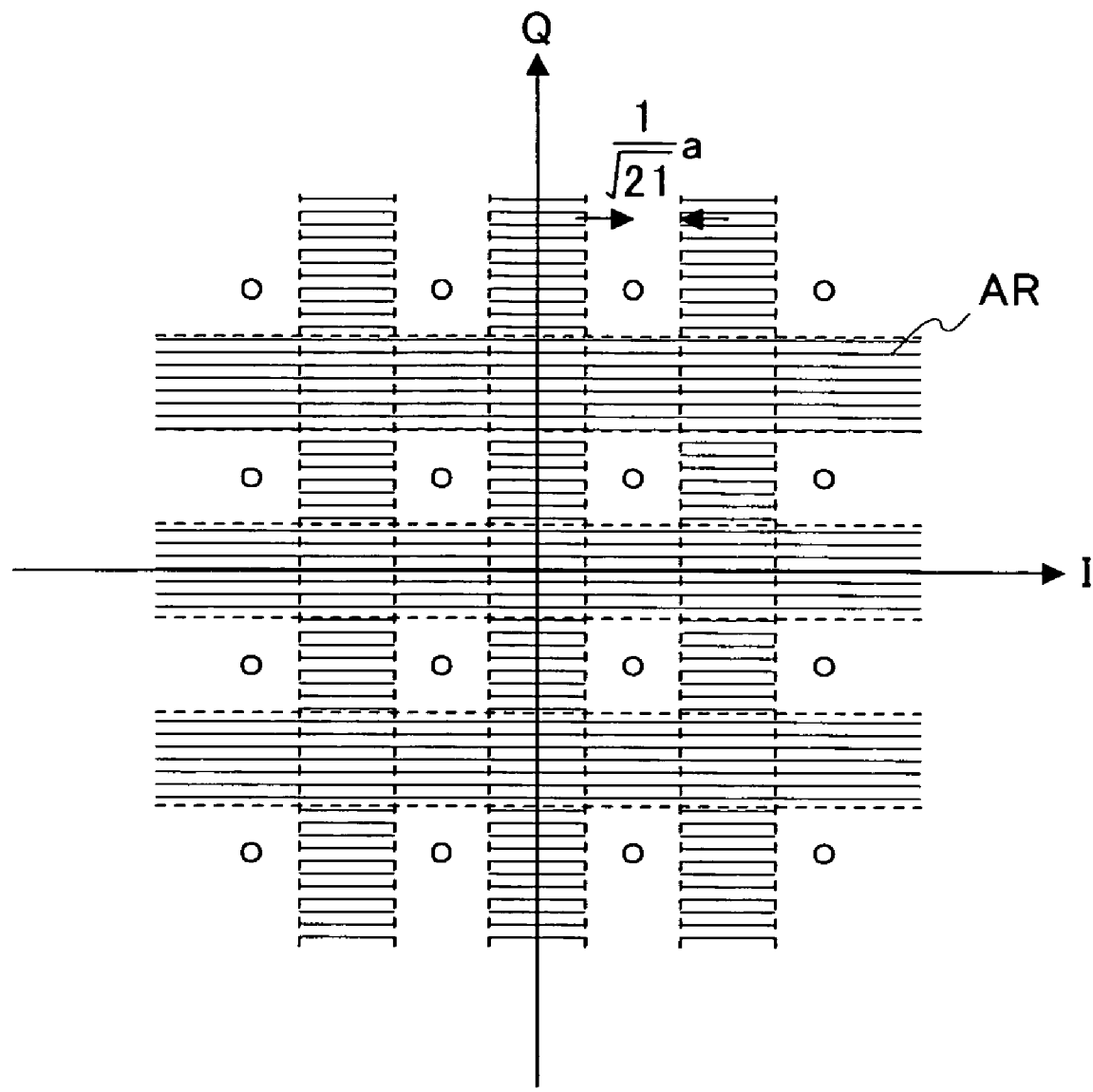
FIG. 21 illustrates thresholds for detecting simulated errors of a 64-value QAM signal from a 16-value QAM signal.

The threshold calculation section 1702 sets thresholds at $a/\sqrt{5} \pm a/\sqrt{21}$, $3a/\sqrt{5} \pm a/\sqrt{21}$ located at a distance of $a/\sqrt{21}$ from the respective signal points of the 16-value QAM signal as shown in FIG. 21.

The error decision section 1704 uses this threshold and decides in simulation, when the sequentially input I and Q components are found in an area beyond a range set by a threshold ths from the 16-value QAM signal points, that is, when the I and Q components enter the area AR in FIG. 21, that an amplitude decision error has occurred and outputs the decision result as a simulated error detection result.

Furthermore, the above-described embodiments have determined a simulated bit error rate and bit errors using IQ vectors of a received modulated signal, but when a pilot symbol or unique word symbol segment is inserted in a received burst, it is also possible to use vectors in this segment instead of PSK-based modulated signals such as QPSK and BPSK.

Figure 22:
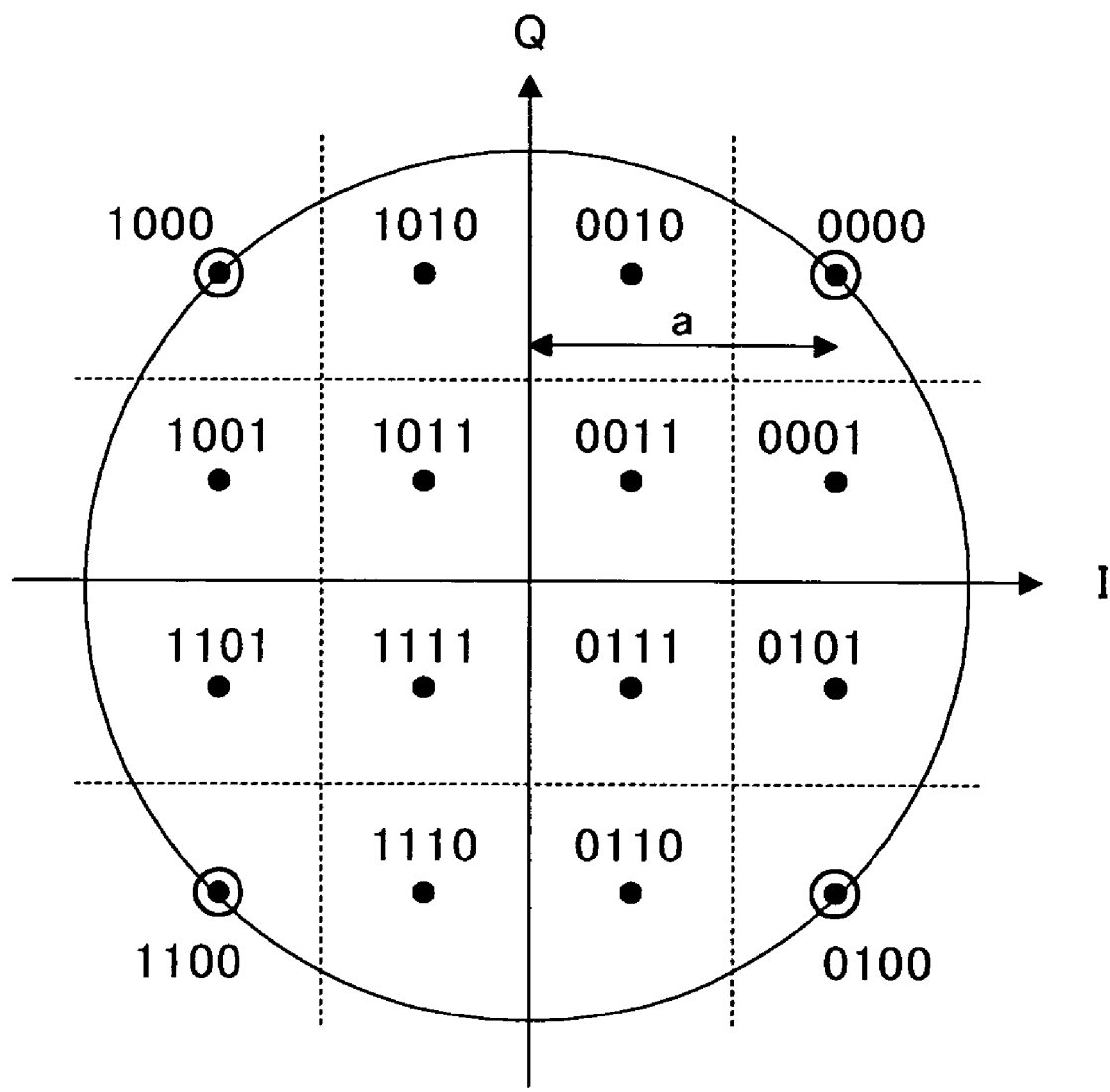
FIG. 22 illustrates threshold settings according to another embodiment.

Furthermore, above-described Embodiment 1 uses values of $\pm(1-1/\sqrt{5})a$ as the thresholds to decide threshold decision errors for an average signal point amplitude a of a QPSK modulated signal and this is because Embodiment 1 assumes a system in which a QPSK signal and 16-value QAM signal are transmitted with the same power, that is, with the same average effective amplitude. Therefore, if the QPSK signal and 16-value QAM signal are sent with different transmit power values, the thresholds are not limited to this, and it is obvious that if it is possible to estimate a difference of transmit power values beforehand, thresholds can be set based on this difference. For example, as shown in FIG. 22, in the case of a communication system in which an average signal point amplitude of a QPSK signal coincides with a maximum signal point amplitude of a 16-value QAM signal (○ denotes an average signal point amplitude of QPSK and ● denotes distributed locations of a 16-value QAM signal), the aforementioned thresholds can be set to $\pm(2/3)a$.

Likewise, above-described Embodiment 2 uses values of $\pm(1\pm1/\sqrt{21})a$ as the thresholds to decide amplitude decision errors for an average signal point amplitude a, and this is because Embodiment 2 assumes a system in which a QPSK signal and 64-value QAM signal are transmitted with the same power, that is, with the same average effective amplitude. Therefore, if the QPSK signal and 64-value QAM signal are sent with different transmit power values, the thresholds are not limited to this, and it is obvious that if it is possible to estimate a difference of transmit power values beforehand thresholds can be set based on this difference.

Furthermore, above-described Embodiment 1 has described the case where a final simulated bit error rate Pe is calculated based on Expression (6), but the present invention is not limited to this, and in the case of a system which only requires an estimate value of the simulated bit error rate to be calculated, it is possible to output the threshold decision error rate Pa determined from Expression (3) as the final simulated bit error rate of a 16-value QAM signal.

Furthermore, above-described Embodiment 1 has described the case where the threshold decision error rate Pa is determined and then the simulated bit error rate Pe of 16 QAM is determined based on this value, but the calculation sequence is not limited to this, and it is only necessary to finally obtain the same result as that of Expression (6). Therefore, it is possible to calculate, for example, an overall bit error count Ne in a 16 QAM signal from a threshold decision error count Na from the following Expression (11) and divide Ne by the total bit count Nb (=2×N=4×Nsym) of the 16 QAM signal according to Expression (12).

$$Ne = 1.5 \times Na \tag{11}$$

$$\begin{aligned} Pe &= \pi/Nb \\ &= (1.5 \times Na)/(2 \times N) \\ &= 0.75 \times Na/N \end{aligned} \tag{12}$$

Furthermore, above-described Embodiment 1 adopts the configuration in which the threshold for deciding threshold decision errors is set to a value $\pm(1-1/\sqrt{5})a$ for the average signal point amplitude a of a QPSK modulated signal and the counter is incremented assuming that an amplitude decision error has occurred when the IQ vector of a received symbol satisfies the conditions of Expression (1) or Expression (2), but the present invention is not limited to this. It is also possible, for example, to adopt a configuration of further setting values $(1+1/\sqrt{5})a$ as thresholds ths_i2 and ths_q2 for the respective components of the I-axis direction and Q-axis direction, incrementing the counter also when the IQ vector rx=(ri, rq) of the received symbol satisfies the following Expression (13) or Expression (14) assuming that their respective threshold decision errors have occurred and calculating amplitude decision bit error rate Pa'. In this case, the following Expression (15) can be used instead of Expression (5) for correction of the bit error rate:

$$ri < -ths\_i2 \text{ or } ths\_i2 < ri \tag{13}$$

$$rq < -ths\_q2 \text{ or } ths\_q2 < rq \tag{14}$$

$$Pe = (3/8) \times Pa' \tag{15}$$

Figure 12:
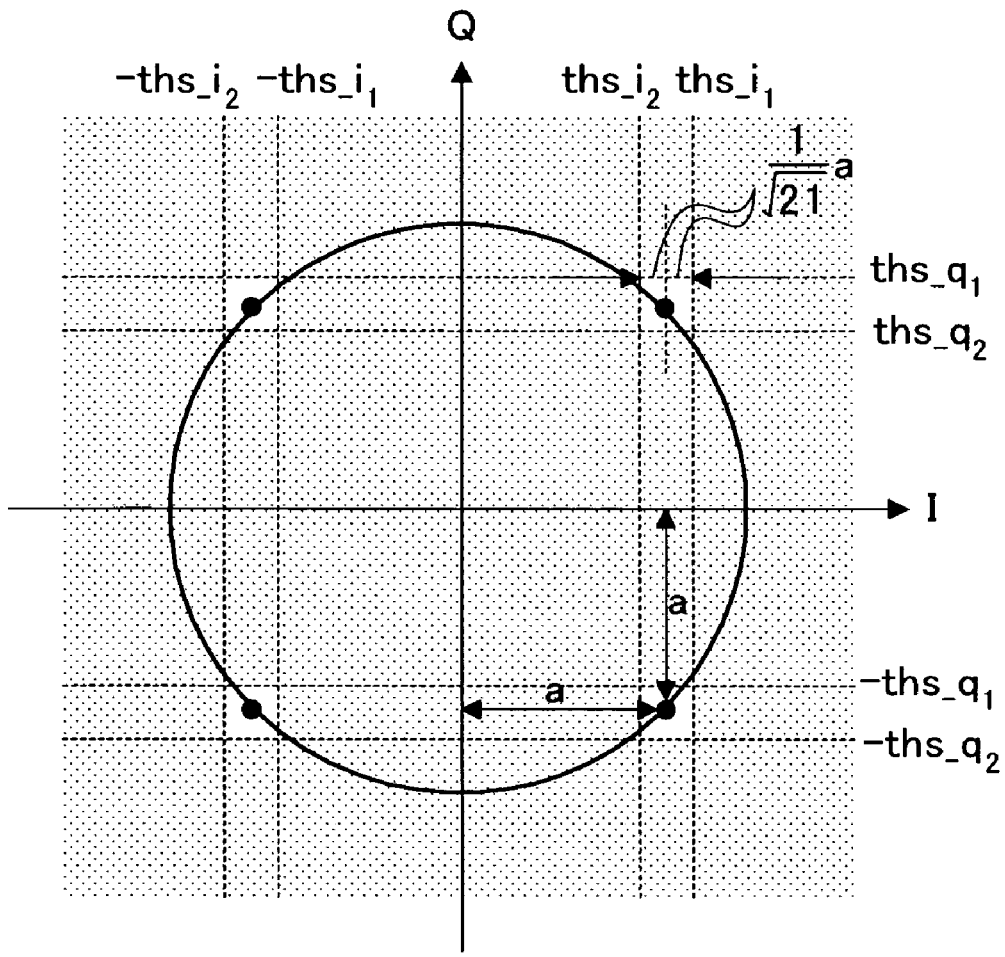
FIG. 12 illustrates an example of setting thresholds for the QPSK signal according to Embodiment 2.

Likewise, above-described Embodiment 2 adopts the configuration in which the threshold for deciding threshold decision errors is set to two values $\pm(1\pm1/\sqrt{21})a$ for the average signal point amplitude a of a QPSK modulated signal and the counter is incremented assuming that an amplitude decision error has occurred when the IQ vector of a received symbol enters the shaded area in FIG. 12, but the present invention is not limited to this. For example, it is also possible to adopt a configuration of setting thresholds thhs_i2 and ths_q2 to $(1-1/\sqrt{21})$ only for the respective components of the I-axis direction and Q-axis direction, incrementing the counter when the IQ vector rx=(ri, rq) of the received symbol satisfies the following Expression (16) or Expression (17) assuming that their respective threshold decision errors have occurred and calculating amplitude decision bit error rate Pa". In this case, the following Expression (18) can be used instead of Expression (10) for correction of the bit error rate:

$$-ths\_i2 < ri < ths\_i2 \tag{16}$$

$$-ths\_q2 < rq < ths\_q2 \tag{17}$$

$$Pe = (7/12) \times Pa'' \tag{18}$$

Figure 23:
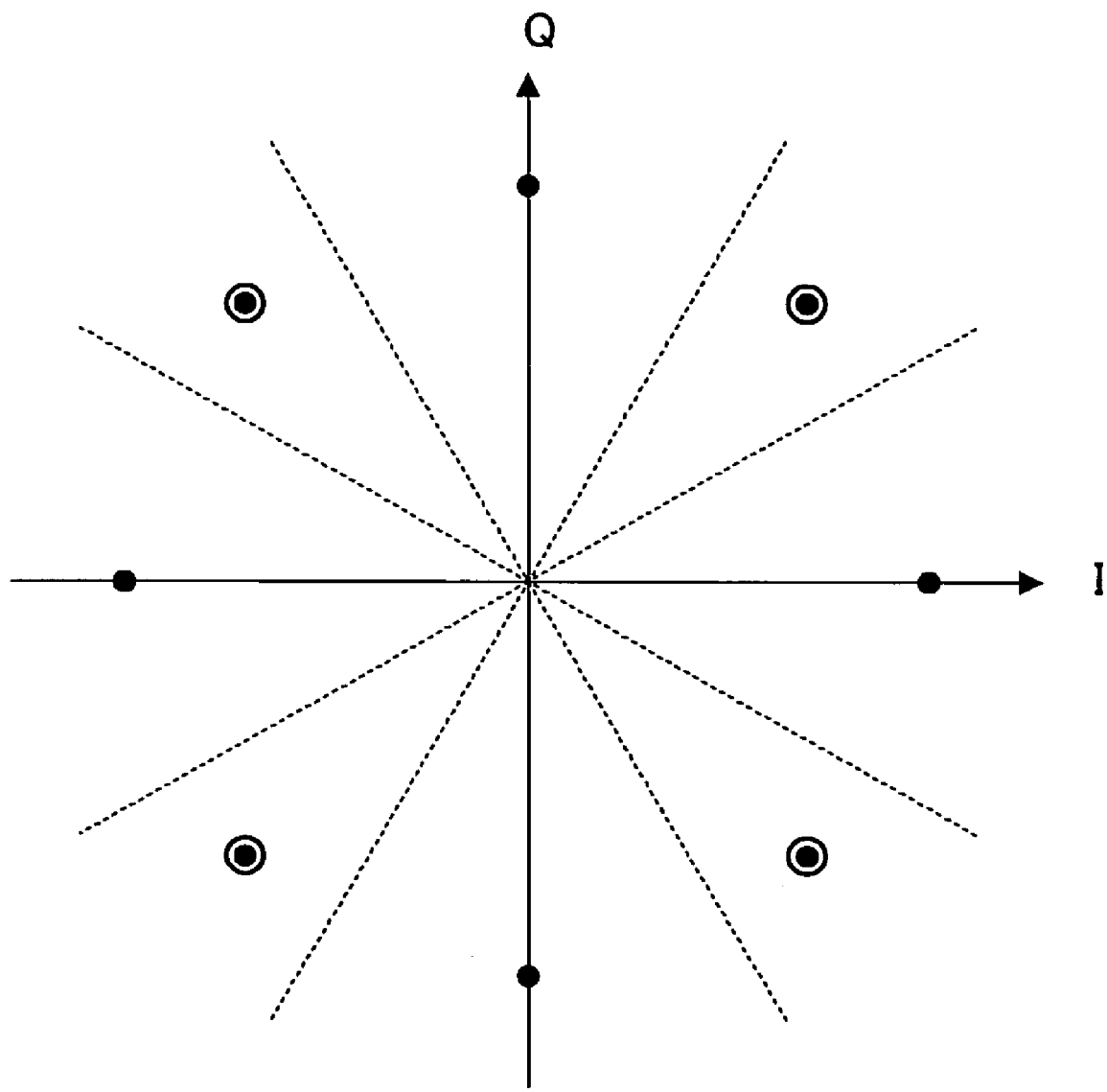
FIG. 23 illustrates threshold settings according to a further embodiment.

Furthermore, the above-described embodiments have described the case where the thresholds for calculating a simulated bit error rate or bit errors are set in parallel to the I-axis and Q-axis, but the present invention is not limited to this. For example, instead of setting thresholds in parallel to the I-axis and Q-axis, it is also possible to set thresholds to predetermined phase conditions in the rotation direction of the axis centered on the origin as shown in FIG. 23. This makes it possible to estimate not only multi-value QAM but also a simulated bit error rate or bit error assuming reception of a multi-phase PSK modulated signal. By the way, ○ in FIG. 23 denotes a QPSK signal symbol and ● denotes an 8PSK signal symbol. In this case, it is possible to calculate a simulated bit error rate (or simulated error) for an 8PSK signal by setting thresholds at rotation positions expressed by dotted lines in the figure and calculating a rate at which the received QPSK signal exceeds this threshold (or whether it has exceeded the threshold or not).

Furthermore, the above-described embodiments have described the configuration of calculating a simulated bit error rate as the communication quality as an example, but the present invention is not limited to this and can also adopt a configuration, for example, of detecting in simulation as to whether bit errors can occur in a predetermined frame instead of a bit error rate.

Furthermore, the present invention is easily adaptable so that error correcting coding in Embodiment 6 is applicable to the configuration of above-described Embodiment 5. In this case, to be more accurate, the relationship in Expression (10) explained in Embodiment 2 holds between the probability Pa that an amplitude decision bit error will occur with 64-value QAM and an overall 64-value QAM bit error probability Pe.

When the number of amplitude decision errors is 6 or smaller, there is a high possibility that the number of bit errors in the entire 64 QAM will be smaller than 2. Therefore, it is possible to adopt a configuration in which when the number of errors is up to 6, it is decided that no residual bit errors can occur in the error correction block, whereas when the number of errors exceeds 6, it is decided that residual bit errors can occur.

Furthermore, above-described Embodiments 5 and 6 have not particularly described a case where the communication apparatuses 1000 and 1400 fail to receive a communication acknowledgment signal on the uplink for some influences, but it is also possible to handle this case as if NACK had been received or ignore it assuming that the communication is disabled.

Furthermore, the above-described embodiments have supposed that codes used for decoding are BCH codes, but the present invention is not limited to this, it is obvious that other block codes are also applicable. Furthermore, even when convolutional codes or turbo codes are used, simulated error detection is possible if it is possible to estimate whether errors are correctable or not based on the number of errors detected and detection positions. More specifically, it is possible to estimate beforehand whether it is possible to correct errors or not from patterns of a coding generating polynomial and error locations, and therefore this relationship can be provided beforehand as a table.

Furthermore, when a communication is carried out based on adaptive modulation on the downlink in above-described Embodiments 3 to 6, the communication apparatuses 1100 and 1500 identify the modulation system during reception/demodulation, but the present invention is not limited to this method. Therefore, it is also possible to adopt a method of inserting a modulation system identification symbol in a burst in communication and using this or use a method whereby the communication apparatuses 1100 and 1500 autonomously identify the modulation system without using predetermined identification information, a so-called blind identification method.

Moreover, the above-described embodiments have not described components other than the components described in the transmitters/receivers because they are not particularly limited. For example, interleave processing of transmission data and burst configuration processing, etc., may or may not exist in the apparatus.

Above-described Embodiments 3 to 6 have described the case where QPSK and 16-value QAM are the modulation systems used for adaptive modulation on the downlink, but the present invention is not limited to this and various modulation systems are also applicable. Moreover, the present invention is not limited to two types of modulation systems and it is also possible to adopt a system of adaptively switching among a plurality of types of modulation systems.

For example, assuming that a third modulation system C whose average distance between signal points is Dc if a relationship of Da>Db>Dc holds, the present invention is also applicable to a case where adaptive modulation changeover is carried out among three types of modulation systems A, B and C.

More specifically, when the modulation system A is QPSK, modulation system B is 16-value QAM and modulation system C is 64-value QAM, it is possible to adopt a configuration that simulated error detection of modulation system B is performed during reception of modulation system A and simulated error detection of modulation system C is performed during reception of modulation system B. It is possible to perform only error detection of modulation system C during reception of modulation system C and perform changeover to modulation system B when the frequency of error detection exceeds a predetermined frequency. Furthermore, it is also possible to adopt a configuration of performing simulated error detection of modulation system C during reception of modulation system A or modulation system B.

Furthermore, the same transmit power is assumed for both the downlink and downlink, but the present invention is not limited to this and different transmit power values can also be used if the difference between the power values is known beforehand. In that case, since it is possible to estimate a bit error rate on the downlink based on the information on the estimated simulated bit error rate and the transmit power difference, the modulation system can be selected based on this value.

Furthermore, the target modulation system in the configuration of Embodiment 6 is not limited to 16-value QAM, but is also applicable to other modulation systems. For example, when it is applied to 64-value QAM, a relationship according to Expression (3) holds between the probability Pa for an amplitude decision bit error to occur in 64-value QAM and an overall 64-value QAM bit error probability Pe.

When the number of amplitude decision errors is 6 or smaller, there is a high probability that the number of bit errors on the entire 64-value QAM will be smaller than 2. For this reason, it is also possible to adopt a configuration that allows the system to decide that no residual bit errors can occur in the error correction block when the number of errors is up to 6 or contrarily decide that some residual bit errors can occur when the number of errors exceeds 6.

It is further possible to include the error correction coding shown in above-described Embodiment 6 in the configuration of estimation of a simulated bit error rate shown in Embodiments 1 and 2, and in this case, it is possible to adopt a configuration counting only residual bit errors obtained through the above-described processing and calculating the bit error rate after error correction processing in simulation.

Furthermore, the present invention is not restricted by the multiplexing system or secondary modulation system in a communication system, but applicable if the above-described modulation system is used for primary modulation. For example, the present invention is also applicable to a system in which adaptive modulation is applied as primary modulation by QPSK modulation or multi-value QAM and then code division multiple access is applied through spread spectrum as secondary modulation and also applicable to a system in which frequency hopping processing is applied as secondary modulation, and further applicable to a system in which Orthogonal Frequency Division Multiplexing (OFDM) is applied as secondary modulation.

Furthermore, the above-described embodiments have described the case where the present invention is applied to a radio communication, but the present invention is not limited to this and is also applicable, for example, to optical communication, etc., and widely applicable to apparatuses that transmit data by applying digital modulation processing.

Furthermore, the above-described embodiments have described the case where the bit error rate calculation apparatus 10 calculates a simulated bit error rate, but the present invention is not limited to this and it goes without saying that it is also possible to adopt a configuration that processes these components through an FPGA (Field Programmable Gate Array), ASIC (Application Specific Integrated Circuit), CPU (Central Processing Unit) or DSP (Digital Signal Processing), etc.

Furthermore, the present invention is not limited to the above-described embodiments but can be implemented modified in various ways. For example, the above-described embodiments have described the case where the communication quality estimation method of the present invention is implemented through a bit error rate detection apparatus, simulated error detection apparatus and communication apparatus, but the present invention is not limited to this, and it is also possible to implement the bit error rate detection apparatus, simulated error detection apparatus and communication apparatus by software.

For example, it is also possible to store a program to execute a communication quality estimation method of the present invention in a ROM (Read Only Memory) beforehand and allow the CPU (Central Processor Unit) to operate the program.

Furthermore, it is also possible to store a program to execute the communication quality estimation method of the present invention in a computer-readable storage medium, record the program stored in the storage medium in a RAM (Random Access memory) of a computer and allow the computer to operate according to the program.

The present invention is not limited to the above-described embodiments but can be implemented modified in various ways.

The communication quality estimation method of the present invention is designed to include a reception step of receiving a signal digital-modulated and transmitted according to a first modulation system and a communication quality simulated estimation step of estimating communication quality, in simulation assuming a signal is digital-modulated and transmitted according to a second modulation system which is different from the first modulation system.

According to this method, simulated communication quality of the modulated signal modulated according to the second modulation system can be estimated from the modulated signal modulated according to the first modulation system, which makes it possible to predict the communication quality of the modulated signal modulated according to the second modulation system beforehand without actually transmitting the modulated signal.

The communication quality estimation method of the present invention is adapted in such a way that the communication quality simulated estimation step includes a threshold calculation step of calculating thresholds on an IQ plane based on an average position of sequentially input symbols on the IQ plane of the first digital-modulated signal which is digital-modulated according to the first modulation system and a theoretical distribution state of the symbols on the IQ plane of the second digital-modulated signal which is digital-modulated according to the second modulation system, and a simulated bit error rate calculation step of calculating the simulated bit error rate of the second digital-modulated signal as the communication quality by sequentially deciding the positions of the sequentially input symbols on the IQ plane of the first digital-modulated signal in comparison with the above-described threshold.

According to this method, in the threshold calculation step, a new threshold is calculated considering the distribution state of the second digital-modulated signal on the IQ plane instead of the threshold to calculate the bit error rate of the conventional first digital-modulated signal for the first digital-modulated signal. Actually, when the bit error rate of the second digital-modulated signal is higher than the bit error rate of the first digital-modulated signal, this threshold becomes a threshold with a wider area where signals are decided as bit errors than that of the threshold used to calculate the bit error rate of the conventional first digital-modulated signal considering the second digital-modulated signal. As a result, since the simulated bit error rate of the second digital-modulated signal is calculated using this threshold in the simulated bit error rate calculation step, it is possible to calculate the simulated bit error rate of the second digital-modulated signal speedily and accurately.

The communication quality estimation method of the present invention is adapted in such a way that the communication quality simulated estimation step includes a threshold calculation step of calculating thresholds on the IQ plane based on an average position of sequentially input symbols on the IQ plane of the first digital-modulated signal which is digital-modulated according to the first modulation system and a theoretical distribution state of the symbols on the IQ plane of the second digital-modulated signal which is digital-modulated according to the second modulation system, and a simulated error detection step of detecting bit errors in simulation, assuming the signal is digital-modulated and transmitted according to the second modulation system by sequentially deciding the positions of the sequentially input symbols on the IQ plane of the first digital-modulated signal in comparison with the above-described threshold and outputting the detection result as the above-described communication quality.

According to this method, the threshold on the IQ plane is obtained based on average positions of the I and Q components when the received signal according to the first modulation system is demodulated, a threshold decision is applied to the I components and Q components of the sequentially received signals according to the first modulation system and simulated error detection of signals according to the second modulation system is performed, and therefore, it is possible to make an appropriate decision as to whether errors occur or not when signals are transmitted according to the second modulation system instead of the first modulation system through the same transmission path.

In the communication quality estimation method of the present invention, the first digital-modulated signal has periodically inserted pilot signals, and in the threshold calculation step, a threshold on the IQ plane is calculated based on the positions of the pilot signals on the IQ plane and a theoretical distribution state of the symbols of the second digital-modulated signal on the IQ plane, and in the simulated bit error rate calculation step (or simulated error detection step), the positions of sequentially input pilot signals on the IQ plane are sequentially decided in comparison with the above-described threshold and the simulated bit error rate (or bit errors) of the second digital-modulated signal is thereby calculated.

In-the communication quality estimation method of the present invention, the first digital-modulated signal is a signal with a unique word string inserted in a predetermined location, and in the threshold calculation step, a threshold on the IQ plane is calculated based on the position of the unique word string on the IQ plane and a theoretical distribution state of the symbols of the second digital-modulated signal on the IQ plane, in the simulated bit error rate calculation step (or simulated error detection step), the positions of sequentially input unique word strings on the IQ plane are sequentially decided in comparison with the above-described threshold, and the simulated bit error rate (or simulated error) of the second digital-modulated signal is thereby calculated.

These methods calculate thresholds based on pilot signals and a unique word string, which are easier to detect than other signals and calculate a simulated bit error rate (or simulated errors), and can thereby calculate a simulated bit error rate (or simulated errors) of the second digital-modulated signal more speedily and accurately.

The communication quality estimation method of the present invention is designed to include an error counting step of counting the number of errors detected in the error decision step within a predetermined unit for correcting signal errors, and a decoding error detection step of deciding, when signals are transmitted according to the second modulation system, whether signals are error-correctable or not based on the number of errors detected in the error counting step.

According to this method, the simulated frequency with which errors occur in received data in the case where the modulation system is changed from the first modulation system to the second modulation system is counted, it is decided whether this simulated error frequency falls within an error-correctable range or not, and it is therefore possible to decide, also during a communication using error correcting coding, whether errors occur in the received data when the modulation system is changed from the first modulation system to the second modulation system before the changeover of the modulation system.

The communication quality estimation apparatus of the present invention adopts a configuration including a reception section that receives a signal digital-modulated and transmitted according to a first modulation system, a communication quality simulated estimation section that estimates communication quality based on the signal point positions of a digital-modulated signal according to a first system received, in simulation, assuming a signal is digital-modulated and transmitted according to a second modulation system which is different from the first modulation system and a transmission section that transmits the simulated communication quality obtained by the communication quality simulated estimation section.

This configuration allows the communication apparatus on the other end of communication carrying out adaptive modulation to receive simulated communication quality information and perform changeover processing for an appropriate modulation system according to a propagation path environment.

The above-described transmission section of the communication apparatus of the present invention sends a simulated ACK/NACK signal about the signal according to the second modulation system based on the simulated communication quality obtained by the communication quality simulated estimation section.

This configuration makes it possible to effectively use ACK/NACK signals which are existing signals used for an automatic repeat request system to send simulated communication quality information to the station on the other end of communication and also allow the station on the other end of communication to perform adaptive modulation processing based on simulated communication quality information using existing ACK/NACK signals.

The communication system of the present invention adopts a configuration including a first and second transmission/reception stations communicable with each other, a reception section that is provided on the first transmission/reception station and receives a first digital-modulated signal which is digital-modulated according to a first modulation system sent from the second transmission/reception station, a transmission section that is provided on the first transmission/reception station and sends a first or second digital-modulated signal obtained by selectively applying first or second modulation processing to the transmission signal to the second transmission/reception station, a communication quality simulated estimation section that estimates the communication quality in simulation, assuming a signal is digital-modulated and transmitted according to a second modulation system different from the first modulation system based on the signal point positions of the digital-modulated signal according to the first modulation system received by the reception section, and a modulation system selection section that selects modulation processing at the transmission section according to the simulated communication quality obtained by the communication quality simulated estimation section.

According to this configuration, the modulation system selection section of the first transmission/reception station can change the modulation processing of the transmission section from the first modulation processing to the second modulation processing according to the simulated communication quality of the second digital-modulated signal speedily and accurately calculated by the communication quality simulated estimation section. As a result, the first transmission/reception station can speedily and accurately change from the first digital modulation processing with a low bit error rate (small communication capacity) to the second digital modulation processing with a high bit error rate (large communication capacity) to transmit data, and thereby increase the communication capacity while keeping the communication quality high.

The communication system of the present invention adopts a configuration including a first and second transmission/reception stations communicable with each other, a reception section that is provided on the first transmission/reception station and receives a first digital-modulated signal which is digital-modulated according to a first modulation system sent from the first transmission/reception station, a transmission section that is provided on the first transmission/reception station and sends a first or second digital-modulated signal obtained by selectively applying first or second modulation processing to the transmission signal to the second transmission/reception station, a communication quality simulated estimation section that is provided on the second transmission/reception station and estimates the communication quality in simulation, assuming a signal is digital-modulated and transmitted according to a second modulation system different from the first modulation system based on the signal point positions of the digital-modulated signal according to the first modulation system received by the reception section, and a transmission section that is provided on the second transmission/reception station and sends the simulated communication quality obtained by the communication quality simulated estimation section as a selection signal for selecting modulation processing at the transmission section provided on the first transmission/reception station.

According to this configuration, the transmission section of the first transmission/reception station can speedily and accurately change the modulation processing from the first modulation processing to the second modulation processing based on the selection signal sent from the second transmission/reception station. As a result, the first transmission/reception station can speedily and accurately change from the first digital modulation processing with a low bit error rate (small communication capacity) to the second digital modulation processing with a high bit error rate (large communication capacity) to transmit data, and thereby increase the communication capacity while keeping the communication quality high.

The above-described first and second transmission/reception stations of the communication system of the present invention adopt a configuration carrying out bi-directional communication through the same frequency channel according to time division duplex.

This configuration makes it possible to obtain simulated communication quality in a reception environment of the same communication quality as that of a transmission environment, thereby perform changeover processing for a modulation system more suitable for the transmission path environment and further perform modulation system changeover processing while keeping the communication quality high.

As described above, the present invention estimates, based on the signal point positions of a digital-modulated signal according to a first modulation system received, communication quality in simulation, assuming a signal is digital-modulated and transmitted according to a second modulation system which is different from the first modulation system, and can thereby implement a communication quality estimation method and communication quality estimation apparatus capable of speedily and accurately determining the communication quality when a signal is transmitted according to a modulation system with a high bit error rate based on a transmission signal according to a modulation system with a low bit error rate.

Furthermore, by applying this communication quality estimation method and communication quality estimation apparatus to a communication system carrying out adaptive modulation, the present invention can perform changeover to an appropriate modulation system when the modulation system is changed from a modulation system with a low bit error rate to a modulation system with a high error rate.

This application is based on the Japanese Patent Application No. 2001-251940 filed on Aug. 22, 2001, the Japanese Patent Application No. 2002-68831 filed on Mar. 13, 2002, and the Japanese Patent Application No. 2002-225203 filed on Aug. 1, 2002, entire content of which is expressly incorporated by reference herein.

INDUSTRIAL APPLICABILITY

The present invention is preferably used in a radio communication system using, for example, an adaptive modulation system.

What is claimed is:

1. A communication quality estimation method comprising:
receiving a first signal digital-modulated and transmitted according to a first modulation scheme; and
estimating communication quality of a second modulation scheme, having a lower noise robustness than the first modulation scheme, in simulation of a second signal, comprising the first signal digital-modulated and transmitted according to the second modulation scheme, based on a threshold decision for signal vector positions of the received signal.

2. The communication quality estimation method according to claim 1, wherein estimating the communication quality of the second modulation scheme comprises:
calculating thresholds on an IQ plane based on an average position of sequentially input symbols on the IQ plane of the first digital-modulated signal which is digital-modulated according to the first modulation scheme and a theoretical distribution of the symbols on the IQ plane of the second digital-modulated signal which is digital-modulated according to the second modulation scheme; and
calculating a simulated bit error rate of the second digital-modulated signal as the communication quality by sequentially determining positions of the sequentially input symbols on the IQ plane of the first digital-modulated signal in comparison with the calculated thresholds.

3. The communication quality estimation method according to claim 2, wherein calculating the simulated bit error rate further comprises multiplying the calculated simulated bit error rate by a predetermined correction value to determine a final simulated bit error rate.

4. The communication quality estimation method according to claim 2, the first digital-modulated signal comprising periodically inserted pilot signals, wherein:
calculating the thresholds comprises calculating each threshold on the IQ plane based on positions of the pilot signals on the IQ plane and a theoretical distribution of the symbols of the second digital-modulated signal on the IQ plane; and
calculating the simulated bit error rate of the second digital-modulated signal comprises sequentially determining the positions of sequentially input pilot signals on the IQ plane in comparison with said each threshold.

5. The communication quality estimation method according to claim 2, the first digital-modulated signal comprising a unique word string inserted at a predetermined location, wherein:
calculating the thresholds comprises calculating each threshold on the IQ plane based on a position of the unique word string on the IQ plane and a theoretical distribution of the symbols of the second digital-modulated signal on the IQ plane; and
calculating the simulated bit error rate of the second digital-modulated signal comprises sequentially determining the positions of sequentially input unique word strings on the IQ plane in comparison with each threshold.

6. The communication quality estimation method according to claim 1, wherein estimating the communication quality of the second modulation scheme comprises:
calculating thresholds on an IQ plane based on an average position of sequentially input symbols on the IQ plane of the first digital-modulated signal which is digital-modulated according to the first modulation scheme and a theoretical distribution of the symbols on the IQ plane of a simulated second digital-modulated signal which is digital-modulated according to the second modulation scheme; and
determining bit errors in simulation in the simulated second digital-modulated signal by sequentially determining positions of the sequentially input symbols on the IQ plane of the first digital-modulated signal in comparison with the calculated thresholds and outputting the detection result as the estimated communication quality.

7. The communication quality estimation method according to claim 6, wherein:
the first digital-modulated signal comprises a PSK modulated signal and the second digital-modulated signal comprises a multi-value QAM modulated signal; and
the thresholds are calculated considering values corresponding to amplitude thresholds for I and Q components between neighboring signal points of the multi-value QAM modulated signal.

8. The communication quality estimation method according to claim 6, wherein:
the first digital-modulated signal comprises a PSK modulated signal and the second digital-modulated signal comprises a multi-phase PSK modulated signal which has more phases than the first digital-modulated signal; and
the thresholds are calculated considering the phase components between neighboring signal points of the multi-phase PSK modulated signal.

9. The communication quality estimation method according to claim 6, the first digital-modulated signal comprising periodically inserted pilot signals, wherein:
calculating the thresholds comprises calculating each threshold on the IQ plane based on positions of the pilot signals on the IQ plane and a theoretical distribution of the symbols of the second digital-modulated signal on the IQ plane; and
determining the simulated bit errors of the second digital-modulated signal comprises sequentially determining the positions of sequentially input pilot signals on the IQ plane in comparison with each threshold.

10. The communication quality estimation method according to claim 6, the first digital-modulated signal comprising a unique word string inserted at a predetermined location, wherein:
calculating the thresholds comprises calculating each threshold on the IQ plane based on a position of the unique word string on the IQ plane and a theoretical distribution of the symbols of the second digital-modulated signal on the IQ plane; and
determining the simulated bit errors of the second digital-modulated signal comprises sequentially determining the positions of sequentially input unique word strings on the IQ plane in comparison with each threshold.

11. The communication quality estimation method according to claim 6, further comprising:
counting the number of determined bit errors within a predetermined unit for correcting signal errors; and
when signals are transmitted according to the second modulation system, determining whether the signals are error-correctable or not based on the number of determined bit errors.

12. The communication quality estimation method according to claim 1, wherein an average distance between signal points of the first modulation scheme is greater than an average distance between signal points of the second modulation scheme;

13. The communication quality estimation method according to claim 1, wherein the first digital-modulated signal and the second digital-modulated signal are subjected to spread spectrum processing as secondary modulation.

14. The communication quality estimation method according to claim 1, wherein the first digital-modulated signal and the second digital-modulated signal are subjected to frequency hopping processing as secondary modulation.

15. The communication quality estimation method according to claim 1, wherein the first digital-modulated signal and the second digital-modulated signal are subjected to orthogonal frequency division multiplexing processing as secondary modulation.

16. The communication quality estimation method according to claim 1, wherein the first digital-modulated signal comprises an MSK modulated signal.

17. The communication quality estimation method according to claim 1, wherein the first digital-modulated signal comprises a GMSK modulated signal having a transmission band restricted by a Gaussian filter.

18. The communication quality estimation method according to claim 1, wherein the first digital-modulated signal comprises an FSK modulated signal.

19. The communication quality estimation method according to claim 1, wherein the first digital-modulated signal comprises a GFSK modulated signal having a transmission band is restricted by a Gaussian filter.

20. A communication quality estimation apparatus comprising:
a receiver that receives a first signal digital-modulated and transmitted according to a first modulation scheme and outputs an orthogonal IQ vector for each symbol; and
a simulated communication quality estimator that estimates communication quality of a second modulation scheme having a lower noise robustness than the first modulation scheme, in simulation of a case in which the first signal is digital-modulated and transmitted according to the second modulation scheme, based on a threshold decision for signal vector positions of the received first digital-modulated signal.

21. The communication quality estimation apparatus according to claim 20, the simulated communication quality estimator comprising:
a threshold calculator that calculates thresholds on an IQ plane based on an average position of sequentially input symbols on the IQ plane of the first digital-modulated signal which is digital-modulated according to the first modulation scheme and a theoretical distribution of the symbols on the IQ plane of a second digital-modulated signal which is digital-modulated according to the second modulation scheme; and
a simulated bit error rate calculator that calculates a simulated bit error rate of the second digital-modulated signal as the communication quality by sequentially determining positions of the sequentially input symbols on the IQ plane of the first digital-modulated signal in comparison with the calculated thresholds.

22. The communication quality estimation apparatus according to claim 20, the simulated communication quality estimator comprising:
an average amplitude detector that detects an average amplitude of the first digital-modulated signal which is digital-modulated according to the first modulation scheme based on signal point positions of the signal digital-modulated and transmitted according to the first modulation system;
a threshold calculator that calculates a range of signal point positions from the average amplitude as a threshold, in which signals can be received correctly according to the second modulation system; and
an error determiner that determines, when the positions of the received signal points according to the first modulation system do not fall within the range calculated by said threshold calculator, that errors have been detected.

23. A communication apparatus comprising:
a receiver that receives a first signal digital-modulated and transmitted according to a first modulation system;
a simulated communication quality estimator that estimates communication quality of a second modulation scheme having a lower noise robustness than the first modulation scheme, in simulation of a case in which the first signal is digital-modulated and transmitted according to the second modulation scheme, based on a threshold decision for signal vector positions of the received first digital-modulated signal; and
a transmitter that transmits the estimated simulated communication quality obtained by said simulated communication quality estimator.

24. The communication apparatus according to claim 23 wherein the adaptive modulator and transmitter transmits a simulated ACK/NACK signal corresponding to the signal which is modulated and transmitted according to the second modulation scheme based on the simulated communication quality obtained by said simulated communication quality estimator.

25. A communication apparatus comprising:
an adaptive modulator and transmitter configured for modulating and transmitting a signal to be transmitted according to one of a first modulation scheme and a second modulation scheme having lower noise robustness than the first modulation scheme; and
a receiver that receives a signal for reporting a reception bit error estimated in simulation of a case in which the signal is modulated and transmitted according to the second modulation scheme, based on a threshold decision resulting from a communication partner receiving and demodulating a previous signal modulated and transmitted according to the first modulation scheme at a communication partner;
wherein the adaptive modulator and transmitter changes from the first modulation scheme to the second modulation scheme when the reporting signal indicates that no error has been detected.

26. A communication method comprising:
detecting whether bit errors occur in a signal in simulation of a case in which the signal is digital-modulated and transmitted according to a second modulation scheme having a lower noise robustness than a first modulation scheme, based on a threshold value for an orthogonal IQ vector for each symbol of the signal; and
notifying a transmitter of a detection result;
wherein the modulation scheme of a signal to be transmitted is changed based on the detection result.

27. A communication system comprising at least first and second transmission/reception stations communicable with each other; wherein the first transmission/reception station comprises:
a receiver that receives a first digital-modulated signal which is digital-modulated and transmitted according to a first modulation scheme by the second transmission/reception station;
an adaptive modulator/transmitter that selectively sends a digital-modulated signal subjected to modulation processing according to one of the first modulation scheme and a second modulation scheme to the second transmission/reception station;
a simulated communication quality estimator that estimates a communication quality of the second modulation scheme in simulation of a case in which the signal is digital-modulated and transmitted according to the second modulation scheme, which is different from the first modulation scheme, based on signal vector positions of the digital-modulated signal according to said first modulation scheme received by the receiver; and
a modulation scheme selector that selects modulation processing at the adaptive modulator/transmitter according to the simulated communication quality obtained by the simulated communication quality estimator.

28. The communication system according to claim 27, wherein said simulated communication quality estimator comprises:
a threshold calculator that calculates thresholds on an IQ plane based on an average position of sequentially input symbols on the IQ plane of the first digital-modulated signal which is digital-modulated according to the first modulation scheme and a theoretical distribution of the symbols on the IQ plane of the second digital-modulated signal which is digital-modulated according to the second modulation scheme; and
a simulated bit error rate calculator that calculates a simulated bit error rate of the second digital-modulated signal as the communication quality by sequentially determining positions of the sequentially input symbols on the IQ plane of the first digital-modulated signal in comparison with the calculated thresholds.

29. The communication system according to claim 27, wherein said simulated communication quality estimator comprises:
a threshold calculator that calculates thresholds on an IQ plane based on an average position of sequentially input symbols on the IQ plane of the first digital-modulated signal which is digital-modulated according to the first modulation scheme and a theoretical distribution of the symbols on the IQ plane of the second digital-modulated signal which is digital-modulated according to the second modulation scheme; and
a simulated error detector that detects bit errors in simulation of a case in which the signal is digital-modulated and transmitted according to the second modulation scheme by sequentially determining positions of the sequentially input symbols on the IQ plane of the first digital-modulated signal in comparison with the calculated thresholds.

30. The communication system according to claim 27, wherein the first transmission/reception station and the second transmission/reception station perform bi-directional communication using a same frequency channel according to time division duplex.

31. A communication system comprising at least first and second transmission/reception stations communicable with each other;
wherein the first transmission/reception station comprises:
an adaptive modulator and transmitter that selectively transmits a digital-modulated signal subjected to modulation processing according to one of a first modulation scheme and a second modulation scheme to the second transmission/reception station, in accordance with a selection signal received from the second transmission/reception station; and wherein the second transmission/reception station comprises:
  a receiver that receives the digital-modulated signal which is digital-modulated according to the first modulation scheme;
  a simulated communication quality estimator that, when the digital-modulated signal has been subjected to modulation processing according to the first modulation scheme, estimates the communication quality of the second modulation scheme in simulation of a case in which the signal is digital-modulated and transmitted according to the second modulation scheme, which is different from the first modulation scheme based on signal vector positions of the received digital-modulated signal which is digital-modulated and transmitted according to the first modulation scheme; and
  a transmitter that sends information relating to the simulated communication quality obtained by the simulation communication quality estimator as the selection signal for selecting modulation processing at the adaptive modulator and transmitter of the first transmission/reception station.

32. The communication system according to claim 31, wherein said simulated communication quality estimator comprises:
  a threshold calculator that calculates thresholds on an IQ plane based on an average position of sequentially input symbols on the IQ plane of the first digital-modulated signal which is digital-modulated according to the first modulation scheme and a theoretical distribution of the symbols on the IQ plane of the second digital-modulated signal which is digital-modulated according to the second modulation scheme; and
  a simulated bit error rate calculator that calculates a simulated bit error rate of the second digital-modulated signal as the communication quality by sequentially determining positions of the sequentially input symbols on the IQ plane of the first digital-modulated signal in comparison with the calculated thresholds.

33. The communication system according to claim 31, wherein said simulated communication quality estimator comprises:
  a threshold calculator that calculates thresholds on an IQ plane based on an average position of sequentially input symbols on the IQ plane of the first digital-modulated signal which is digital-modulated according to the first modulation scheme and a theoretical distribution of the symbols on the IQ plane of the second digital-modulated signal which is digital-modulated according to the second modulation scheme; and
  a simulated error detector that detects bit errors in simulation of a case in which the signal is digital-modulated and transmitted according to the second modulation scheme by sequentially determining positions of the sequentially input symbols on the IQ plane of the first digital-modulated signal in comparison with the calculated thresholds.

34. The communication system according to claim 31, wherein the first transmission/reception station and the second transmission/reception station perform bi-directional communication using different frequency channels according to frequency division duplex.

35. The communication system according to claim 31, wherein the second modulation scheme comprises a lower noise robustness than the first modulation scheme.

36. The communication system according to claim 35, wherein the simulated communication quality estimator estimates the communication quality of the second modulation scheme using a threshold decision for the signal vector positions of the received digital-modulated signal of the first modulation scheme.

37. A computer readable medium that stores a program for estimating communication quality, the computer readable medium comprising:
  a determining code segment that determines signal vector positions of a received digital-modulated signal according to a first modulation scheme; and
  an estimating code segment that estimates communication quality of a second modulation scheme in simulation of a case in which the signal is digital-modulated and transmitted according to a second modulation scheme which is different from the first modulation scheme.

38. The computer readable medium according to claim 37, wherein the estimating code segment comprises:
  a threshold calculating code segment that calculates thresholds on an IQ plane based on an average position of sequentially input symbols on an IQ plane of the first digital-modulated signal which is digital-modulated according to said first modulation scheme and a theoretical distribution of the symbols on the IQ plane of the second digital-modulated signal which is digital-modulated according to the second modulation scheme; and
  a simulated bit error rate calculating code segment that calculates a simulated bit error rate of the second digital-modulated signal as the communication quality by sequentially deciding positions of the sequentially input symbols on the IQ plane of the first digital-modulated signal in comparison with the calculated thresholds.

39. The computer readable medium according to claim 37, wherein the estimating code segment comprises:
  a threshold calculating code segment that calculates thresholds on the IQ plane based on an average position of sequentially input symbols on an IQ plane of the first digital-modulated signal which is digital-modulated according to the first modulation scheme and a theoretical distribution of the symbols on the IQ plane of the second digital-modulated signal which is digital-modulated according to the second modulation scheme; and
  a simulated error detecting code segment that detects bit errors in simulation for a case in which the signal is digital-modulated and transmitted according to the second modulation scheme by sequentially deciding positions of the sequentially input symbols on the IQ plane of the first digital-modulated signal in comparison with the calculated thresholds.

40. The computer readable medium according to claim 37, wherein the second modulation scheme comprises a lower noise robustness than the first modulation scheme.

41. The computer readable medium according to claim 40, wherein the communication quality of the second modulation scheme is estimated by a threshold decision for signal vector positions of the received digital-modulated signal of the first modulation scheme.

42. A communication system comprising at least first and second transmission/reception stations communicable with each other;
  wherein the second transmission/reception station comprises:
    a transmitter that digital-modulates and transmits a signal according to a first modulation scheme; and wherein the first transmission/reception station comprises:
- a receiver that receives and demodulates the signal digital-modulated and transmitted according to the first modulation scheme by the second transmission/reception station, and that outputs an orthogonal IQ vector for each symbol of the signal;
- an adaptive modulator/transmitter that selectively transmits a digital-modulated signal subjected to modulation processing according to one of the first modulation scheme and a second modulation scheme based on a control signal to the second transmission/reception station;
- a simulated communication quality estimator that estimates a communication quality of the second modulation scheme having lower noise robustness than the first modulation scheme in simulation of a case in which the signal is digital-modulated and transmitted according to the second modulation scheme, based on a threshold decision for the orthogonal IQ vector output from the receiver; and
- a modulation scheme selector that outputs the control signal, used by the adaptive modulator/transmitter to select the first modulation scheme or the second modulation scheme according to the simulated communication quality obtained by the simulated communication quality estimator.

43. A communication system comprising at least first and second transmission/reception stations communicable with each other;
wherein the first transmission/reception station comprises:
- an adaptive modulator/transmitter that selectively transmits a digital-modulated signal subjected to modulation processing according to one of a first modulation scheme and a second modulation scheme based on a control signal, the second modulation scheme having less noise robustness than the first modulation scheme;
- a first receiver that receives a selection signal transmitted from the second transmission/reception station; and
- an adaptive modulation controller that outputs the control signal which controls a modulation scheme selected by the adaptive modulator/transmitter based on the received selection signal; and wherein the second transmission/reception station comprises:
- a second receiver that receives and demodulates the digital-modulated signal according to the first modulation scheme transmitted from the first transmission/reception station, and outputs a demodulation result;
- a simulated communication quality estimator that, in response to the demodulation result, estimates a simulated communication quality of the second modulation scheme in simulation of a case in which the signal is digital-modulated and transmitted according to the second modulation scheme, based on a threshold decision for the demodulation result; and
- a transmitter that transmits information related to the simulated communication quality obtained by the simulated communication quality estimator as the selection signal received by the first receiver of the first transmission/reception station.

* * * * *

UNITED STATES PATENT AND TRADEMARK OFFICE
CERTIFICATE OF CORRECTION

PATENT NO. : 7,130,587 B1
APPLICATION NO. : 10/432601
DATED : October 31, 2006
INVENTOR(S) : T. Hikokubo et al.

It is certified that error appears in the above-identified patent and that said Letters Patent is hereby corrected as shown below:

At column 32, line 37 (claim 4, line 12), of the printed patent, after "comparison with" delete "said".

At column 35, line 18 (claim 24, line 1), of the printed patent, after "claim 23" insert -- , --.

Signed and Sealed this

Eighth Day of May, 2007

JON W. DUDAS
*Director of the United States Patent and Trademark Office*